United States Patent
Pather et al.

(10) Patent No.: US 7,509,304 B1
(45) Date of Patent: Mar. 24, 2009

(54) MESSAGE DISTRIBUTION SYSTEM AND METHOD FOR PROVIDING NOTIFICATION(S)

(75) Inventors: Shyamalan Pather, Seattle, WA (US); Holly Knight, Woodinville, WA (US); Niranjan Nilakantan, Redmond, WA (US); Phil Garrett, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 10/373,328

(22) Filed: Feb. 24, 2003

Related U.S. Application Data

(63) Continuation-in-part of application No. 10/180,360, filed on Jun. 26, 2002.

(51) Int. Cl.
*G06F 7/00* (2006.01)
*G06F 17/30* (2006.01)

(52) U.S. Cl. .............................. 707/3; 707/10; 719/318

(58) Field of Classification Search ............... 707/1–10, 707/100–104.1, 200–206; 709/217–219, 709/224–225, 206, 207; 719/314–318
See application file for complete search history.

(56) References Cited

U.S. PATENT DOCUMENTS

| | | |
|---|---|---|
| 4,774,658 A | 9/1988 | Lewin |
| 5,367,633 A | 11/1994 | Matheny et al. |
| 5,416,725 A | 5/1995 | Pacheco et al. |
| 5,555,346 A | 9/1996 | Gross et al. |
| 5,813,007 A | 9/1998 | Nielsen |
| 5,852,812 A | 12/1998 | Reeder |
| 5,893,091 A | 4/1999 | Hunt et al. |
| 5,973,612 A | 10/1999 | Deo et al. |
| 5,974,406 A | 10/1999 | Bisdikian et al. |
| 5,999,978 A | 12/1999 | Angal et al. |
| 6,021,403 A | 2/2000 | Horvitz et al. |
| 6,055,505 A | 4/2000 | Elston |
| 6,055,570 A | 4/2000 | Nielsen |
| 6,122,633 A | 9/2000 | Leyman et al. |
| 6,138,158 A | 10/2000 | Boyle et al. |
| 6,151,643 A | 11/2000 | Cheng et al. |

(Continued)

OTHER PUBLICATIONS

Stelovsky et al., Software architecture for unified management of event notification and stream I/O and its use for recording and analysis of user events, Jan. 7-10, 2002, IEEE, 1862-1867.*

(Continued)

*Primary Examiner*—Jean B Fleurantin
(74) *Attorney, Agent, or Firm*—Amin, Turocy & Calvin, LLP

(57) ABSTRACT

The present invention relates to a system and methodology to facilitate automated delivery of notifications to notification sinks while mitigating interface development and deployment within the framework of a notification platform. One or more message delivery channels are provided with the notification platform that can be associated with an extension component for delivering the notifications. The extension component automatically wraps an underlying message in a protocol associated with a notification sink such as wrapping a message post from a notification source within a common delivery protocol. The extension component can inherit delivery properties from an underlying platform interface associated with the delivery channels in order to mitigate coding and development details involved when utilizing or invoking the platform interface. Furthermore, the extension component enables various message protocols to be modeled as separate objects without having to implement higher-level or more complex aspects of the underlying interface.

24 Claims, 16 Drawing Sheets

U.S. PATENT DOCUMENTS

| | | | |
|---|---|---|---|
| 6,167,448 A * | 12/2000 | Hemphill et al. ............ | 709/224 |
| 6,173,284 B1 * | 1/2001 | Brown ......................... | 707/10 |
| 6,185,613 B1 * | 2/2001 | Lawson et al. .............. | 709/224 |
| 6,208,996 B1 | 3/2001 | Ben-Shachar et al. | |
| 6,209,011 B1 | 3/2001 | Vong et al. | |
| 6,219,782 B1 | 4/2001 | Khan et al. | |
| 6,256,664 B1 | 7/2001 | Donoho et al. | |
| 6,260,148 B1 | 7/2001 | Aggarwal et al. | |
| 6,275,957 B1 | 8/2001 | Novik et al. | |
| 6,292,825 B1 | 9/2001 | Chang et al. | |
| 6,314,533 B1 | 11/2001 | Novik et al. | |
| 6,353,926 B1 | 3/2002 | Parthesarathy et al. | |
| 6,400,810 B1 | 6/2002 | Skladman et al. | |
| 6,405,191 B1 | 6/2002 | Bhatt et al. | |
| 6,424,966 B1 * | 7/2002 | Meyerzon et al. .............. | 707/3 |
| 6,438,618 B1 | 8/2002 | Lortz et al. | |
| 6,466,949 B2 | 10/2002 | Yang et al. | |
| 6,480,885 B1 | 11/2002 | Olivier | |
| 6,487,548 B1 | 11/2002 | Leymann et al. | |
| 6,510,429 B1 | 1/2003 | Todd | |
| 6,513,026 B1 | 1/2003 | Horvitz et al. | |
| 6,601,012 B1 | 7/2003 | Horvitz et al. | |
| 6,629,138 B1 | 9/2003 | Lambert et al. | |
| 6,643,682 B1 | 11/2003 | Todd et al. | |
| 6,662,195 B1 | 12/2003 | Langseth et al. | |
| 6,704,803 B2 | 3/2004 | Wilson et al. | |
| 6,751,657 B1 | 6/2004 | Zothner | |
| 6,826,560 B1 | 11/2004 | Leymann et al. | |
| 6,829,639 B1 * | 12/2004 | Lawson et al. .............. | 709/224 |
| 6,829,770 B1 | 12/2004 | Hinson et al. | |
| 6,839,730 B1 | 1/2005 | Ramabhadran | |
| 6,910,033 B2 | 6/2005 | Rosenblum | |
| 6,910,070 B1 * | 6/2005 | Mishra et al. ............... | 709/224 |
| 6,938,240 B2 | 8/2005 | Charisius et al. | |
| 6,981,250 B1 | 12/2005 | Wiltamuth et al. | |
| 6,988,262 B1 | 1/2006 | Mallory et al. | |
| 7,089,530 B1 | 8/2006 | Dardinski et al. | |
| 7,275,235 B2 | 9/2007 | Molinari et al. | |
| 2001/0009016 A1 | 7/2001 | Hoffman et al. | |
| 2002/0010804 A1 | 1/2002 | Sanghvi et al. | |
| 2002/0032597 A1 | 3/2002 | Chanos | |
| 2002/0032602 A1 | 3/2002 | Lanzillo et al. | |
| 2002/0032771 A1 | 3/2002 | Gledje | |
| 2002/0035482 A1 | 3/2002 | Coble et al. | |
| 2002/0069244 A1 | 6/2002 | Blair et al. | |
| 2002/0075293 A1 | 6/2002 | Charisius et al. | |
| 2002/0077842 A1 | 6/2002 | Charisius et al. | |
| 2002/0080938 A1 | 6/2002 | Alexander et al. | |
| 2002/0082919 A1 | 6/2002 | Landau et al. | |
| 2002/0087649 A1 | 7/2002 | Horvitz | |
| 2002/0087740 A1 | 7/2002 | Castanho et al. | |
| 2002/0095399 A1 | 7/2002 | Devine et al. | |
| 2002/0120711 A1 | 8/2002 | Bantz et al. | |
| 2002/0136173 A1 | 9/2002 | Monroe et al. | |
| 2002/0154010 A1 | 10/2002 | Tu et al. | |
| 2002/0165729 A1 | 11/2002 | Kuebert et al. | |
| 2002/0194305 A1 | 12/2002 | Sadeghi et al. | |
| 2003/0046539 A1 | 3/2003 | Negawa | |
| 2003/0050046 A1 | 3/2003 | Conneely et al. | |
| 2003/0083952 A1 | 5/2003 | Simpson et al. | |
| 2003/0101322 A1 | 5/2003 | Gardner | |
| 2003/0131143 A1 | 7/2003 | Myers | |
| 2003/0154193 A1 | 8/2003 | Rosenblum | |
| 2003/0177402 A1 | 9/2003 | Piazza | |
| 2004/0002988 A1 | 1/2004 | Seshadri et al. | |
| 2004/0083463 A1 | 4/2004 | Hawley | |
| 2004/0128359 A1 | 7/2004 | Horvitz et al. | |

OTHER PUBLICATIONS

Cabrera et al., Herald: achieving a global event notification service, May 20-22, 2001, IEEE, 87-92.*

Sasu Tarkoma, "Scalable Internet Event Notification Architecture (Siena)", Spring 2002, Helsinki.

Ellen Muraskin, "Notification Engines and Apps", Oct. 5, 2001, www.convergence.com.

"Interactive Notification Server," www.brience.com, Copyright 2000-2002.

"Event Broker/Monitor (BEA TUXEDO System)", 1999, http://edocs.bea.com/wle/wle42/admin/events.htp.

U.S. Appl. No. 10/180,360, filed Jun. 26, 2002, Seshadri, et al.

U.S. Appl. No. 10/376,197, filed Feb. 26, 2003, Seshadri, et al.

U.S. Appl. No. 10/375,300, filed Feb. 27, 2003, Seshadri, et al.

U.S. Appl. No. 10/375,628, filed Feb. 26, 2003, Pather, et al.

U.S. Appl. No. 10/375,250, filed Feb. 27, 2003, Seshadri, et al.

Bea Systems, "Event Subscription and Notifications", 2000, 4 pages, printed Jul. 25, 2005 from http://e-docs.bea.com/tuxedo/tux71/html/dvlibra7.htm.

Hanson, et al., "A Flexible and Recoverable Client/Server Database Event Notification System", VLDB Journal, 1998, vol. 7, pp. 12-24.

"Configurable Interface for Processing Notifications", Aug. 19, 1999, www.sba.widener.edu/saphelp, printed Mar. 6, 2003, 3 pages.

IEEE, "The Authoritative Dictionary of IEEE Standard Terms", 2000, 7th Edition, p. 701.

Berndtsson, et al., "Cooperative Problem Solving: A New Direction for Active Databases", 1996, 4 pages, 2 pages of citation.

Steve Trythall, "JMS and COBRA Notification Interworking", Dec. 12, 2001, www.oreilly.com, printed Mar. 25, 2003, 9 pages.

Microsoft Corporation, "Global XML Web Services Architecture", White Paper, Oct. 2001, 11 pages.

Microsoft Corporation, "An Introduction to Microsoft Transaction Server", Jan. 8, 1998, printed Oct. 21, 2005 from http://msdn.microsoft.com/archive/en-s/dnarmts/html/msdn_mtsintro.asp, 5 pages.

Vassili Bykov, "TOPlink for SmallTalk 5.0: What's new, what's old?", Smalltalk Chronicles, vol. 1, No. 2, Sep. 1999, printed Mar. 19, 2003, 9 pages.

Eric Schmidt, "Reliable XML Web Services", Dec. 11, 2001, Microsoft MSDN, 10 pages, last printed on Apr. 7, 2006.

U.S. Appl. No. 10/180,662, Pather, et al.

U.S. Appl. No. 10/180,159, Seshadri, et al.

Rosenblum, et al., "A Design Framework for Internet-Scale Event Observation and Notification", 1998, 17 pages.

Microsoft Corp., "Microsoft SQL Server Notification Services Technical Overview", Apr. 2002, White Paper, 23 pages.

Rob Taylor, "Transact-SQL", Dec. 20, 2000, SQLTeam.com, 2 pages printed on Jan. 26, 2005 from http://www.sqlteam.com/item.asp?ItemID=1650.

Michael Kantor and David Redmiles, Creating an Infrastructure for Ubiquitous Awareness, Information and Computer Science, University of California, Irvine 92697, 2001.

Bowman, et al. "The Practical SQL Handbook: Using SQL Varients", 2001, pearson technology group, 4th Edition.

Antonio Carzaniga, Design of a Scalable Event Notification Service: Interface and Architecture, Aug. of 1998, U. of Colorado.

Bernheim Brush, et al., "Notification for shared annotation of digital documents", Apr. 2002, ACM Press, vol. 4, Issue No. 1, pp. 89-96.

Chou, et al., "Version and change notification in an object-oriented database system", Jun. 1988, IEEE Computer Society Press, Paper 20.4 275-281.

Gruber, et al. "High-level constructs in the READY event notification system", Sep. 1998, ACM Press, p. 195-202.

IEEE, "The Authoritative Dictionary of IEEE Standards Terms", 2000, 7th Edition, p. 701.

* cited by examiner

MESSAGE DISTRIBUTION SYSTEM AND METHOD FOR PROVIDING NOTIFICATION(S)

REFERENCE TO RELATED APPLICATION(S)

This application is a continuation in part of U.S. patent application Ser. No. 10/180,360 which was filed Jun. 26, 2002, entitled System and Method for Providing Notification (s), the entirety of which is incorporated herein by reference.

TECHNICAL FIELD

The present invention relates generally to computer systems, and more particularly to a system and method for delivering notifications in accordance with a protocol extension handler associated with one or more notification delivery channels.

BACKGROUND OF THE INVENTION

Empowering people to make well-informed decisions has become increasingly important in today's fast-paced environment. Providing individuals with relevant and timely information is an essential element in facilitating such well-informed decisions. However, certain information that is noise to some may be very valuable to others. Additionally, some information can also be temporally critical and as such there may be significant value associated with timely delivery of such information. Moreover, some individuals prefer to stay apprised of information, even though not critical. A challenge is to provide information in a desired manner notwithstanding vast differences in individuals' information and delivery preferences.

Many conventional methods of gathering information require proactively requesting and searching for the information, often mandating sifting through dozens of messages, hundreds of articles, or referencing numbers or trends in reports. Furthermore, existing technologies assume that a person desiring such information is at a computer and has time and ability to retrieve the information. Moreover, people are increasingly mobile and cannot always be within close proximity of a computer. As a result, Internet-enabled mobile devices are becoming increasingly popular and have generated demand for services that deliver timely, personalized information regardless of location, on whatever suitable device is available and accessible.

Some have attempted to accommodate such demand by building systems that allow individuals to subscribe to an application that automatically delivers information of interest. However, most of such information delivery systems have been poorly built employing ad-hoc techniques. Additionally, conventional systems have difficulty with respect to scaling because of the complexity associated with processing meaningful queries in connection with a large number of disparate events or publications, and delivering results to subscribers given the varying types of individual delivery preferences as well as recipient device types. Consequently, conventional notification systems are inefficient, difficult to maintain and administer, unreliable, and are inadequate for hosting large-scale applications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for delivering notifications in accordance with a notification platform. In one aspect of the present invention, a notification platform provides one or more delivery channels for routing notifications from various notification sources to one or more notification sinks. The delivery channels receive information from the sources and automatically format the received information according to a plurality of differing and/or similar protocols. According to one aspect, the received information is associated with a message body that is then wrapped in a delivery protocol packet before being routed to the notification sinks. The wrapping and associated message delivery/response mechanisms are provided as part of an automated packet handler that relieves application developers from having to be intimately knowledgeable of protocol and platform delivery and/or interface details. Thus, the present invention facilitates automated, timely and efficient routing/delivery of notifications to notification sinks while mitigating code size, code re-write, and/or code design when interacting or interfacing with the notification platform.

According to one aspect of the present invention, a protocol extension class is provided that operates in conjunction with the above-described delivery channels. In one example, an extension class (e.g., HTTP or other message extension type) is provided with the delivery channel that creates and sends a post or other type message to the notification sinks (e.g., URL associated with a message post). A body portion of the post or notification can be encoded or supplied as a message body, whereas a message envelope or wrapper can be automatically generated to encapsulate the message body in order to then transmit or post the message envelope to the notification sinks. In this manner, the present invention can easily and efficiently transmit messages without causing developers to be concerned with intricacies of the underlying message protocol. Thus, messages can be automatically wrapped in a delivery protocol that hides the underlying mechanisms for the delivery. Protocol formatters and response-processing components are provided to facilitate notification transmission and handshaking from the delivery channels to the notification sinks which can include various authentication and/or authorization protocols. Moreover, the extension class inherits various properties from a platform communications interface to facilitate integration of different communications protocols with the delivery channels. The communications protocols may be provided or modeled as one or more objects associated with the respective protocols, yet not requiring developers to implement a full platform interface in favor of the automated features provided by the extension class.

In general, the above framework and protocols are adapted to an automated notification system that facilitates providing notification services via a notification architecture that is highly scalable and can process a large volume of queries with respect to a plurality of disparate subscription service providers and subscribers. One aspect of the subject invention provides for a distributed notification platform that facilitates building and maintaining reliable, high performance, and scalable applications. More particularly, the platform of the subject invention provides a manner in which to express event schema, subscription schema, notification schema, and rules in a rich manner (e.g., XML) as well as allowing a subscription service provider to express content formatting and protocols that can be implemented in connection with distributing notifications. The invention includes an execution engine that integrates information propagated in accordance with the aforementioned schema, formatting and protocols to provide highly scalable notification services.

Another aspect of the invention provides for abstracting subscription and subscriber information (as well as event information if desired) to high-level classes (e.g., data fields)—thus the invention provides for modeling such notification related information as data. Subscription applications can thus be developed at high levels wherein complex subscription queries and subscriber information can be defined as data fields for example. Databases in accordance with the data fields can be propagated with subscription/subscriber specific information. The present invention takes advantages of the processing power associated with database engines (e.g., SQL server) to generate notifications via performing a join operation on the databases (e.g., subscription database(s), subscriber database(s) and event database(s)). Accordingly, notifications are generated en masse, as compared to per subscription per subscriber which can consume significant computing resources. By modeling the notification related information (e.g., subscription queries, subscriber information, event information . . . ) as data and leveraging the power of relational database systems to perform set-oriented manipulations on this data efficiently, the present invention provides for a highly scalable and efficient notification system.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate automated delivery of notifications to notification sinks while mitigating interface development and deployment within the framework of a notification platform. One or more message delivery channels are provided with the notification platform that can be associated with an extension component for delivering the notifications. The extension component automatically wraps an underlying message in a protocol associated with a notification sink such as wrapping a message from a notification source within a common Web delivery protocol (e.g., HTTP wrapper). The extension component can inherit delivery properties from an underlying platform interface associated with the delivery channels in order to mitigate coding and development details involved when utilizing or invoking the platform interface. Furthermore, the extension component enables various message protocols to be modeled as separate objects without having to implement lower-level or more complex aspects of the underlying interface.

As used in this application, the terms "component," "channel," "protocol," "system," "wrapper," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
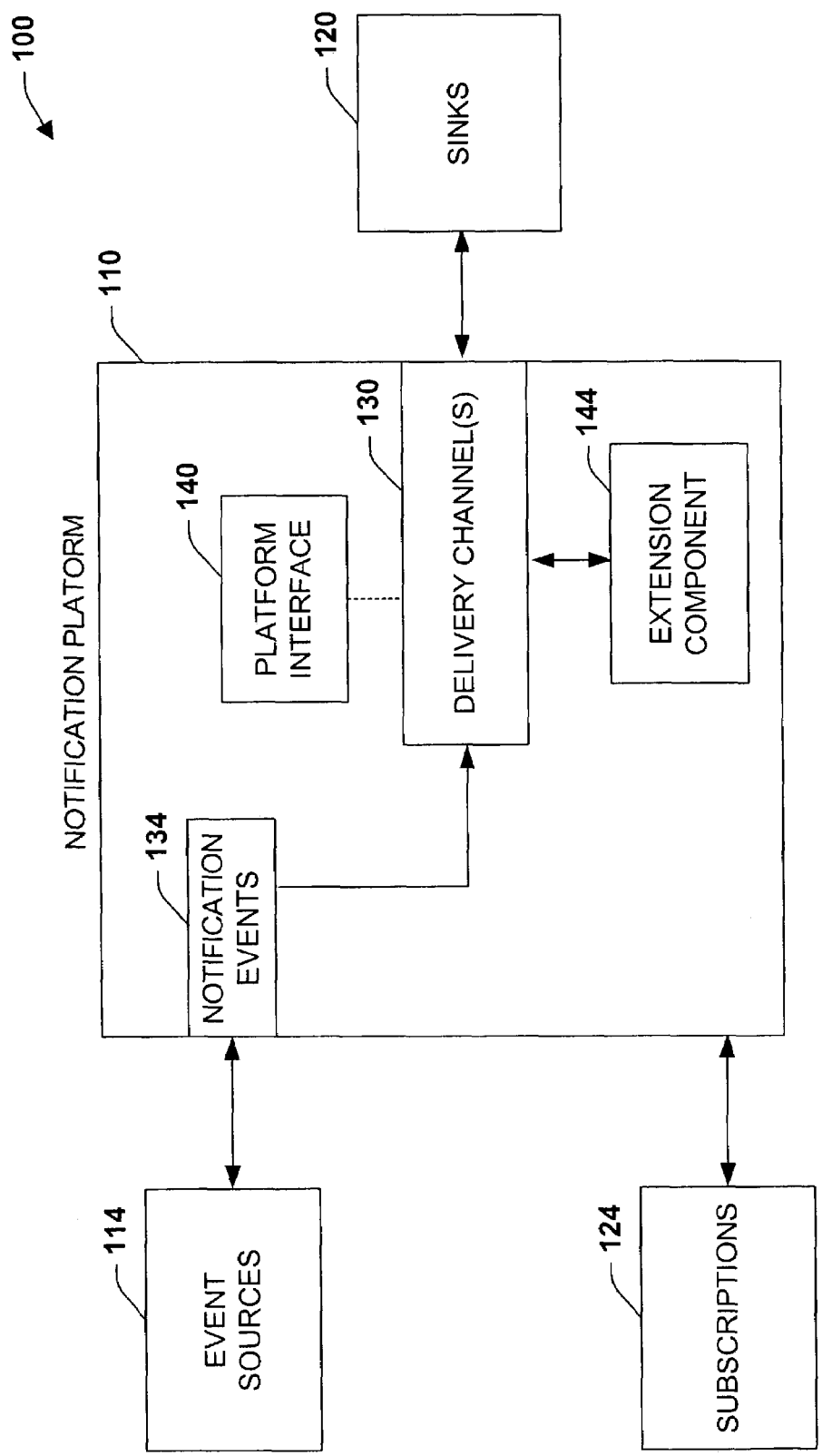
FIG. 1 is a schematic block diagram of a notification delivery system in accordance with an aspect of the present invention.

Referring initially to FIG. 1, a notification delivery system 100 is illustrated in accordance with an aspect of the present invention. The system 100 employs a notification platform 110 (can include multiple servers/clients or parts thereof acting in concert) to distribute information from one or more event sources 114 that generate notifications to one or more notification sinks 120 that receive information from the sources. In order to receive information from the event sources 114, one or more subscriptions 124 are obtained to determine which of the event sources cause automated notifications to occur at the notification sinks 120. For example, a news subscription may request notifications from three different news sources such as a breaking news source, a sports source, and a business news source. If a subscriber has suitably subscribed to this type news subscription, then notifications that are generated from any of the three sources can be passed to the notification sinks 120, wherein the notification platform 110 selects when and if information from the event sources 114 is passed or routed to the sinks. In another example, information gathered from various stock sources may be passed in accordance with a financial service that delivers stock notifications to the sinks 120.

It is noted that the notification platform 110 can include various components such as an SQL server(s) that processes a plurality of event sources 114, and performs join operations to determine which notifications should be distributed to the sinks 120, wherein the notification platform 110 performs various database and communications operations. The notification platform 110 can thus collect or aggregate information from one or more of the event sources 114 and distribute the collected information to the notification sinks 120. It is also noted that various systems and components can be provided to facilitate operations between the notification platform 110, event sources 114 and notification sinks 120 which are described in more detail below.

The notification platform 110 includes at least one delivery channel 130 that receives notifications and/or message events 134 and delivers information associated with the events to the notification sinks 120. The delivery channels 130 are associated with a platform interface 140 that facilitates delivery of the notification events 134 (e.g., socket interface component providing delivery protocol for routing messages to sinks). In one aspect, an extension component 144 is provided that includes automated formatting and delivery-options for routing messages through the delivery channel 130. For example, a notification event 134 can be modeled as a Post message (or other type) that is ultimately routed to a URL address. The extension component 144 can automatically generate protocol packets that wrap the underlying Post in order to present the message in a suitable form at the URL or other type notification sink 120. Thus, the extension component 144 facilitates operation of the delivery channel 130 by exposing and/or inheriting features of the platform interface 140 that are called when delivering notifications. Messages can be transmitted in accordance with an API that automatically formats messages while hiding the underlying mechanisms supportive of the platform interface 140. In this manner, message delivery can be facilitated by automatically formatting or bundling messages for delivery to a medium supported by the notification sink 120, yet without having to invoke or code interfaces that explicitly employ the platform interface 140. In this manner, development time when implementing HTTP-based protocols (or other type protocols) can be reduced.

In general, the delivery channels 130 provide notification delivery which includes the transmission of formatted notifications to one or more recipients. There are several categories of notification delivery targets such as for example:

Desktop: Intra and Internet IM, email/SMTP;

Mobile (Phones, Palms, Tablets): Intra and Internet IM, mobile device/SMS aggregators, and customized services;

Service: HTTP post, customized SOAP/customized Web Methods, File, SQL tables.

Generally, the notification platform 110 (or servers) provides standard delivery channels 130 for high volume (# of deployed customers) or common delivery targets. Custom delivery channels for focused notification deployments may be developed by $3^{rd}$ party application developers and is facilitated by the extension component 144. The delivery channel 138 can be modeled as a combination of 'protocol' and 'transport' functionality. The protocol typically defines how fields in a header and body of a notification are to be populated, and the expected calls, responses and/or errors possible in delivering a notification. The transport is often an operating system provided function or component by which notifications are delivered. To illustrate, the protocol for a mail delivery channel obtains values for the subject, to, from and priority fields in an SMTP header from data provided in a string Dictionary by the notification platform, to the protocol class's delivery method. The delivery channel 130 typically creates a properly formatted message utilizing parameterized data then invokes a delivery class (e.g., SmtpMail) to transport the message to its intended recipient. Delivery channels 130 can be configured via a combination of ADF (Application Description File described below) and Notification Server/Platform configuration files, if desired. ADF protocol elements can be employed to describe how an application uses a protocol. Protocol declarations within the Notification Server configuration file can provide the respective protocol implementation.

It is noted that various protocols can be provided/supported by the extension component 144 and/or delivery channel 130 to facilitate delivering notifications in accordance with the notification platform 110 (e.g., HTTP, SMTP, FTP, TCP/IP, voice encoded extensions, video/image protocols, wireless protocols such as Wireless Mark-up Language (WML), authentication protocols, authorization protocols, security protocols such as SSL, IPSec, IKE, Kerberos, Diffie-Hellman exchanges, and other communications protocols). These protocols can include asynchronous protocols such as a routing protocol for message delivery between a plurality of nodes (e.g., protocol describes end-points of delivery having multiple hops between nodes). Other protocols include various XML protocols such as Simple Object Access Protocol (SOAP) and Web Service Description Language (WSDL), for example, that can be adapted in accordance with various schemas for subscribing, delivering, and receiving notifications from the event sources 114. Messages or notifications can also be processed according to one or more delivery protocols that interact with commercially available network servers/databases associated with the notification platform 110 for processing large amounts of notification data. Such delivery protocols can be executed by the message delivery channel 130 that can include message queuing functions operating with database applications involving event provider and event collector processes to determine if messages have been suitably delivered to the notification sinks 120. These processes can interact with one or more Distributed Transaction Coordinator (DTC) functions or transactions associated with the delivery channel 130, for example, in order to process/transmit data from multiple event sources 114 in a reliable manner.

Figure 2:
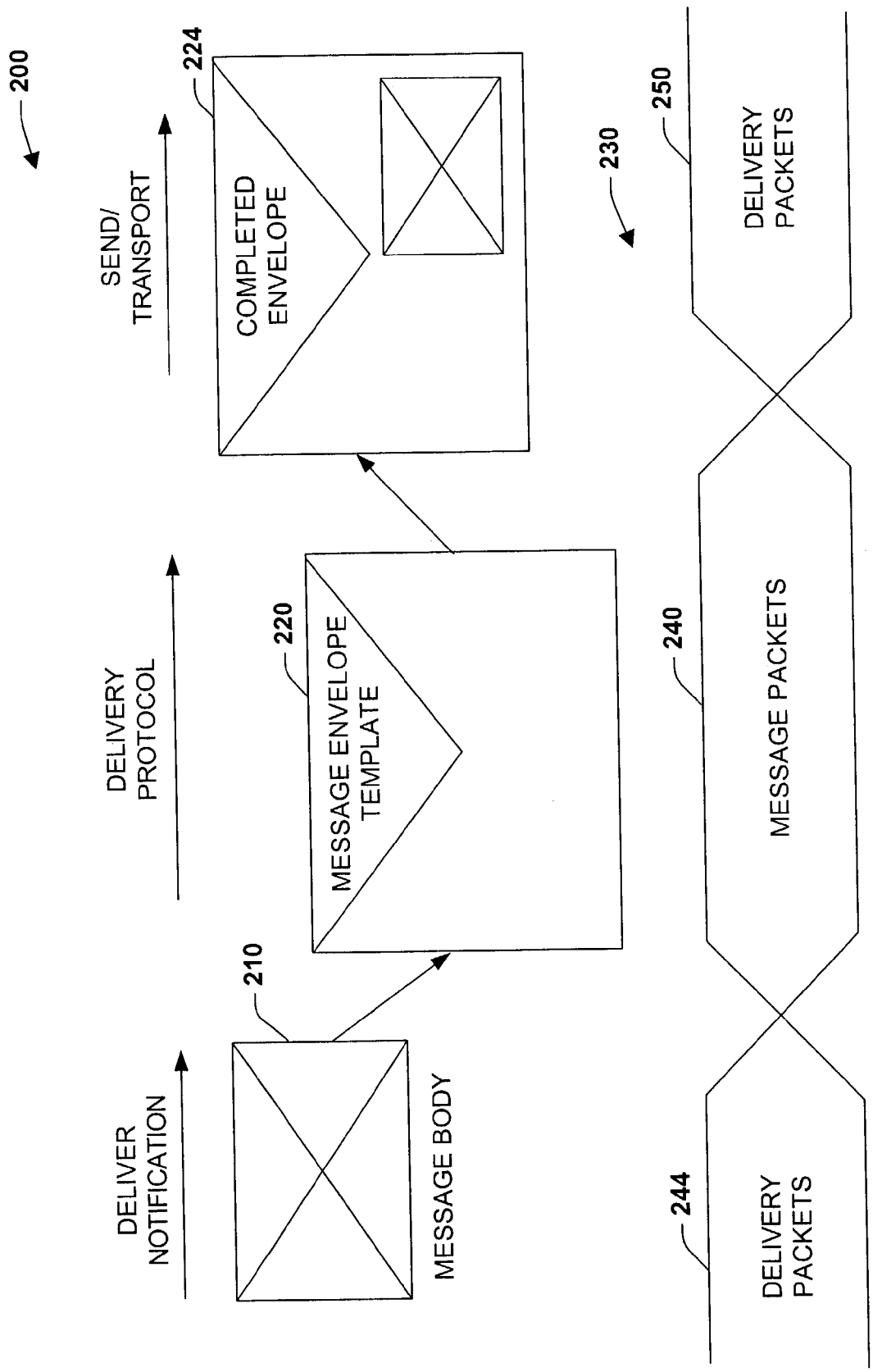
FIG. 2 is a diagram illustrating notification processing and delivery in accordance with an aspect of the present invention.

Referring now to FIG. 2, a diagram 200 illustrates notification processing and delivery in accordance with an aspect of the present invention. A message body 210 contains information generated from an event source(s) that is to be delivered to a notification sink(s). For example, such information can include messages, alerts, updates, postings, images, video, voice data, delivery information such as to addressee and from sender fields, time information, header fields, ID fields, subject fields, subscriber information, priority information relating to the urgency of a notification, and/or other information. The message body 210 is then incorporated within/associated with a message envelope template 220 having an associated delivery protocol (e.g., TCP/IP protocol, HTTP protocol, wireless protocol, and so forth), wherein a completed envelope 224 is transmitted or transported to a notification sink that extracts the message body 210 for subsequent notification to a user and/or machine. In one aspect, the delivery protocol associated with the message envelope template 220 acts as a wrapping protocol for the message body 210 in order to transport information to one or more notification sinks. This type of wrapping is illustrated at 230, wherein the message body 210 is represented as one or more message packets 240 that are encapsulated within (and/or integrated therewith) delivery packets 244 and 250 associated with the delivery protocol. As will be described in more detail below, an extension class (or component) can be provided to automatically construct and transmit the completed envelope 224.

Figure 3:
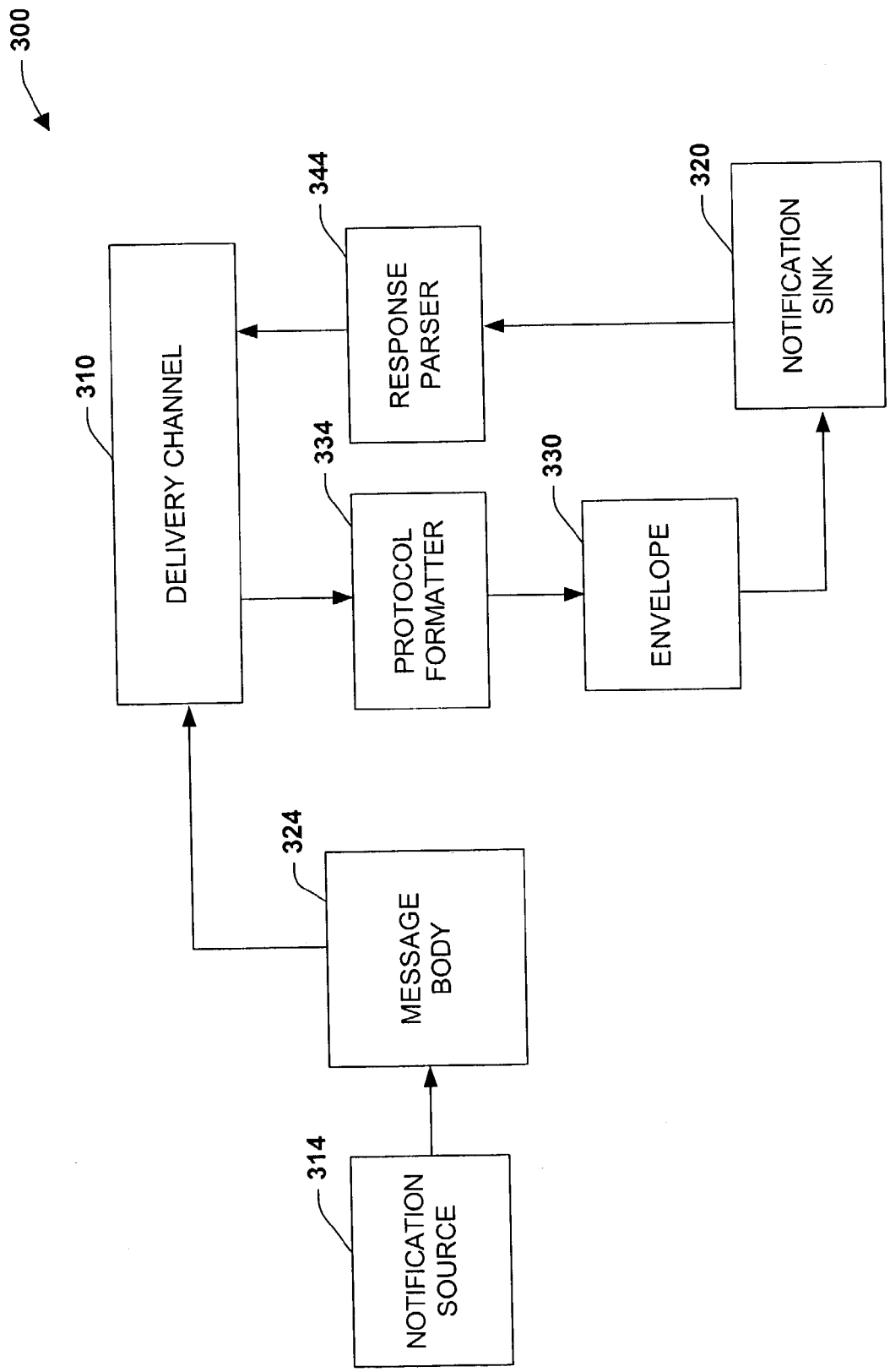
FIG. 3 is a diagram illustrating an exemplary delivery model in accordance with an aspect of the present invention.

Turning to FIG. 3, a system 300 illustrates an exemplary delivery model in accordance with an aspect of the present invention. Although some examples such as HTTP and URL are described, it is to be appreciated that the present invention can be employed with substantially any type of notification protocol, event source, and/or notification sink. It is noted that as used herein, a URL merely identifies an endpoint of a communication but is not generally the endpoint itself. For example, an endpoint may have multiple URLs associated with it, and a single URL may actually refer to many endpoints.

In one example aspect of the present invention, a delivery channel 310 interacts with a notification source 314 (e.g., HTTP post) such as provided from an event source to a configured or adapted notification sink 320 (e.g., sink associated with URL), wherein the body or contents of a message associated with the notification source 314 is supplied as a message body 324. An envelope 330 is formatted by a Protocol Formatter 334 supplied or associated with the delivery channel 310. A response 340 (e.g., HTTP response) is processed by a Response Parser 344 supplied to the delivery channel 310. In one aspect, the system 300 can be employed to configure credentials for Basic and/or Digest authentication as well as other security exchanges and/or negotiations.

In one example aspect of the present invention, a base class is provided to support extensible HTTP based protocols and is referred to as an HttpExtension class. The protocol can be declared in a configuration file if desired, such as in the following example:

```
<Protocols>
  <Protocol>
    <ProtocolName>(e.g., SMSProtocol)</ProtocolName>
    <ClassName>HttpExtension</ClassName>
  </Protocol>
</Protocol>
This declared protocol can then be utilized by one or more delivery
channels 310,
declared in an example configuration file as illustrated below:
<DeliveryChannel>
  <ChannelName>SMSDelivery1
```

-continued

```
<ProtocolName>SMSProtocol</ProtocolName>
<Arguments>
<Argument>           [note: the HTTPExtension class loads
this dll assembly and class name
to get an IHttpProtocolProvider
implementation]
  <Name>ProtocolProviderClassName</Name>
  <Value>Example.SMSDeliveryChannel</Value>
</Argument>
<Argument>
  <Name>ProtocolProviderAssemblyName</Name>
  <Value>%AppPath%[D]eliveryChannel.dll</Value>
</Argument>
<Argument>
  <Name>PostURL</Name>
  <Value>http://jade.notify.msn.com</Value>
</Argument>
<Argument>
  <Name>UserName</Name>        [optional]
  <Value>%User%</Value>
</Argument>
<Argument>
  <Name>Password</Name>        [optional]
  <Value>% Pwd%</Value>
</Argument>
<Argument>
  <Name>Domain</Name>          [optional]
  <Value>%Domain%</Value>
</Argument>
<Argument>
  <Name>Group</Name>           [optional]
  <Value>%Group%</Value>
</Argument>
<Argument>
  <Name>ConnectionLimit</Name> [optional-default is
                                2]
  <Value>10</Value>
</Argument>
<Argument>
  <Name>AsyncPosts</Name>      [optional-default none]
  <Value>4</Value>
</Argument>
<Argument>
<Name>MaxShutdown</Name>       [optional-time in seconds-
  <Value>7</Value>             default 180]
</Argument>
<Argument>
  <Name>ProxyPort</Name>       [optional-default 80]
  <Value'280</Value>
</Argument>
<Argument>
  <Name>ProxyServer</Name>     [optional-default OS configured
WebProxy]
  <Value>itgproxy</Value>
</Argument>
<Argument>
  <Name>ContentType</Name>     [optional default text/xml
                                range are MIME types]
<Value>text/xml</Value>
</Argument>
<Argument>
  <Name>Encoding</Name>
  <Value>UTF8</Value>          [optional default UTF8
                                range are MIME types]
</Argument>
<Argument>
  <Name>SoapAction</Name>      [optional, no default]
  <Value>a soap method</Value>
</Argument>
</Arguments>
```

Figure 4:
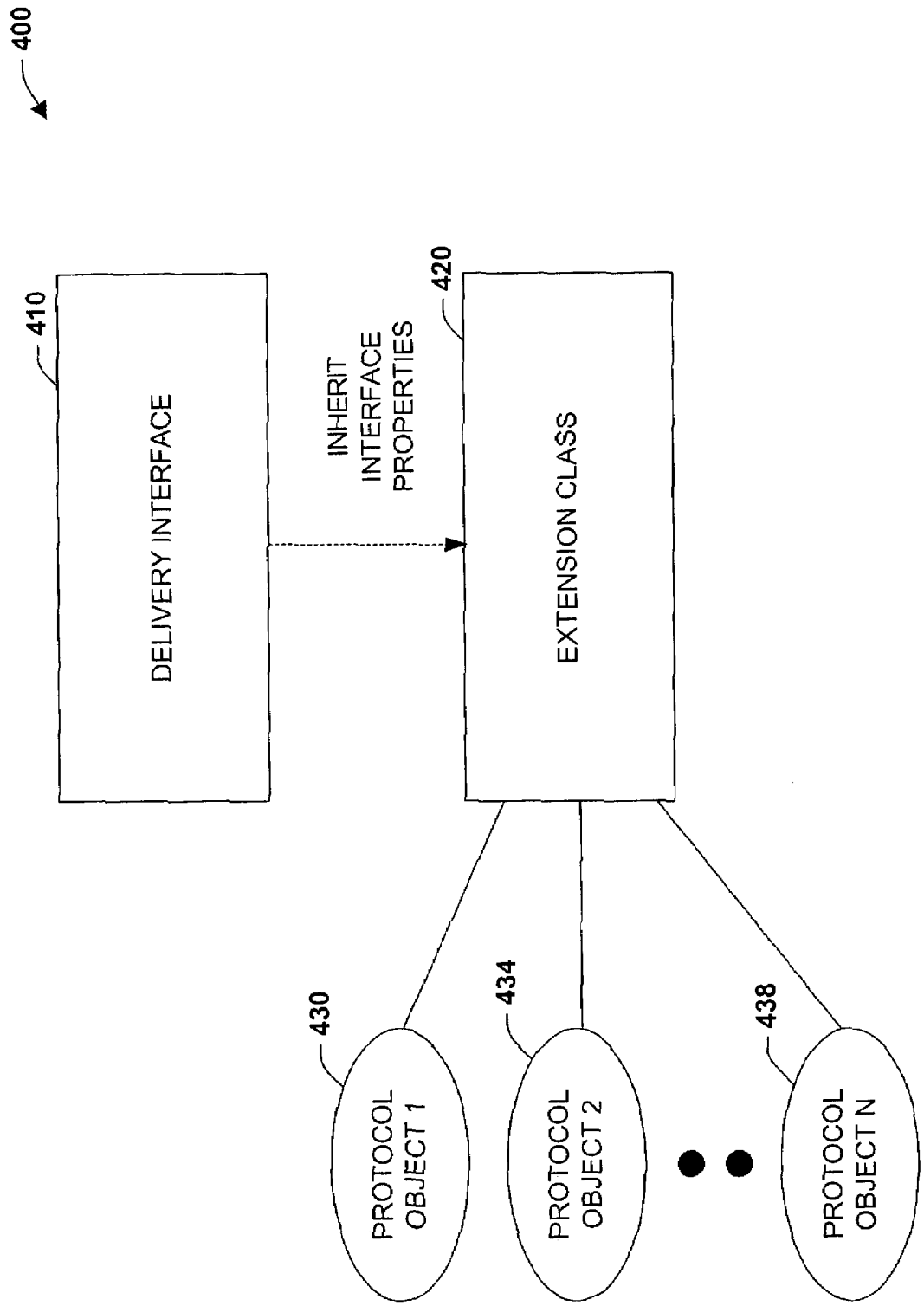
FIG. 4 is a diagram illustrating interactions between a platform delivery interface and an extension class in accordance with an aspect of the present invention.

Referring now to FIG. 4, a system 400 illustrates interactions between a platform delivery interface 410 and an extension class 420 in accordance with the present invention. As illustrated, the extension class 420 can inherit one or more interface or delivery properties from the delivery interface 410. Moreover, the extension class 420 can describe/transport one or more varying and/or similar protocol objects 430-438. Thus, using the model depicted in the system 400, respective protocols can be represented as its own object 430-438, yet, rather than requiring a developer to implement a full delivery interface 410 (e.g., IDeliveryProtocol), the system 400 provides the extension class 420 (e.g., HttpExtension class) which automatically performs much of the transporting and formatting operations.

For example, an HttpExtension calls into a pluggable module (e.g., formatter) to perform automated envelope formatting and, optionally, the parsing of a response body associated with a respective notification site. From the system 400 perspective, protocols written in this manner are similar as protocol objects built from scratch, and so can be configured in a similar manner, wherein an application developer can specify a set of protocol fields in an ADF protocol configuration section for each notification class that supports it. Thus, in this example, the HttpExtension class inherits from an IDeliveryProtocol supplied by the delivery interface 410. It is a class that accepts an IHttpProtocolProvider interface as a parameter to its constructor such as the following example:

class HttpExtension: IDeliveryProtocol

{

HttpExtension(IHttpProtocolProvider provider); }

Other aspects of the delivery interface 410 (e.g., Initialize and DeliverNotification methods) can be implemented by the extension class 420 and accept standard parameters expected by any desired implementation of the delivery interface 410. The following is an example of an IDeliveryProtocol interface:

```
public delegate void NotificationStatusCallback(params
    NotificationStatus[ ] status); public interface IDelivery-
    Protocol
```

```
{
    void Initialize(
        StringDictionary       channelArgs,
        Boolean           multicast,
        NotificationStatusCallback nsc);
    void DeliverNotification(
    NotificationHeaders[ ]        headersList,
    String         body);
    void Flush( );
    void Close( );
}
```

Figure 5:
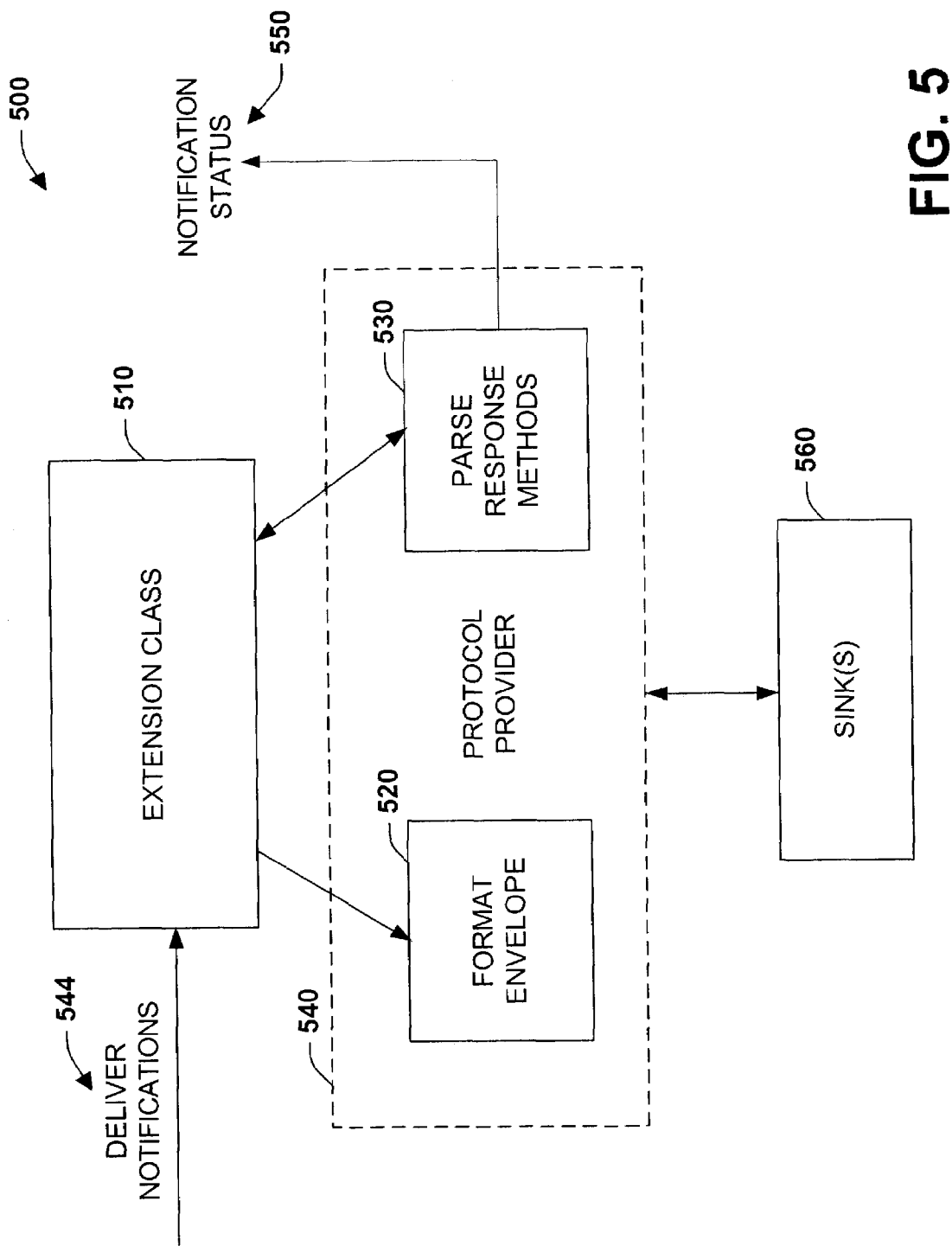
FIG. 5 is a diagram illustrating an example of extension class processing in accordance with an aspect of the present invention.

FIG. 5 is a system 500 illustrating an example of extension class processing in accordance with an aspect of the present invention. An extension class 510 (also referred to as HTTPExtension class) invokes a Format Envelope component 520 and Parse Response methods component 530 which cooperate to form a protocol provider 540 (a class that implements IHttpProtocolProvider). The extension class 510 processes one or more notification events at 544, wherein the Parse Response methods component 530 generates a Notification Status Callback process or path 550 which can also be recorded by the extension class 510. The protocol provider 540 then facilitates delivery of formatted notifications to one or more notification sinks at 560.

The HttpExtension class 510 can thus invoke an HttpProtocol class within the protocol provider 540 for notification delivery, and can pass through initialize and deliver notification parameters that are called via an HttpProtocol implementation which can also include arguments passed to the extension class 510 in order to populate headers and/or other fields (e.g., HTTP headers, content-type, SoapAction, and so forth). It is noted that the HttpExtension class 510 is an extension to support a type of delivery channel described above—not an extension to HTTP protocol. Furthermore, the protocol provider 540 can be declared as illustrated in the following example:

An IHttpProtocolProvider interface can be declared as:

namespace           CompanyName.SqlServer.NotificationServices.ProtocolProvider

```
{
    interface IHttpProtocolProvider
    {
        void Initialize(
            StringDictionary channelArguments);
        string FormatEnvelope(
            StringDictionary[ ] protocolFields,
            String requestBody);
        int ProcessResponse(
        enum         HttpErrorCode,
        String          responseBody);
        void Close( );
    }
}
```

Figure 6:
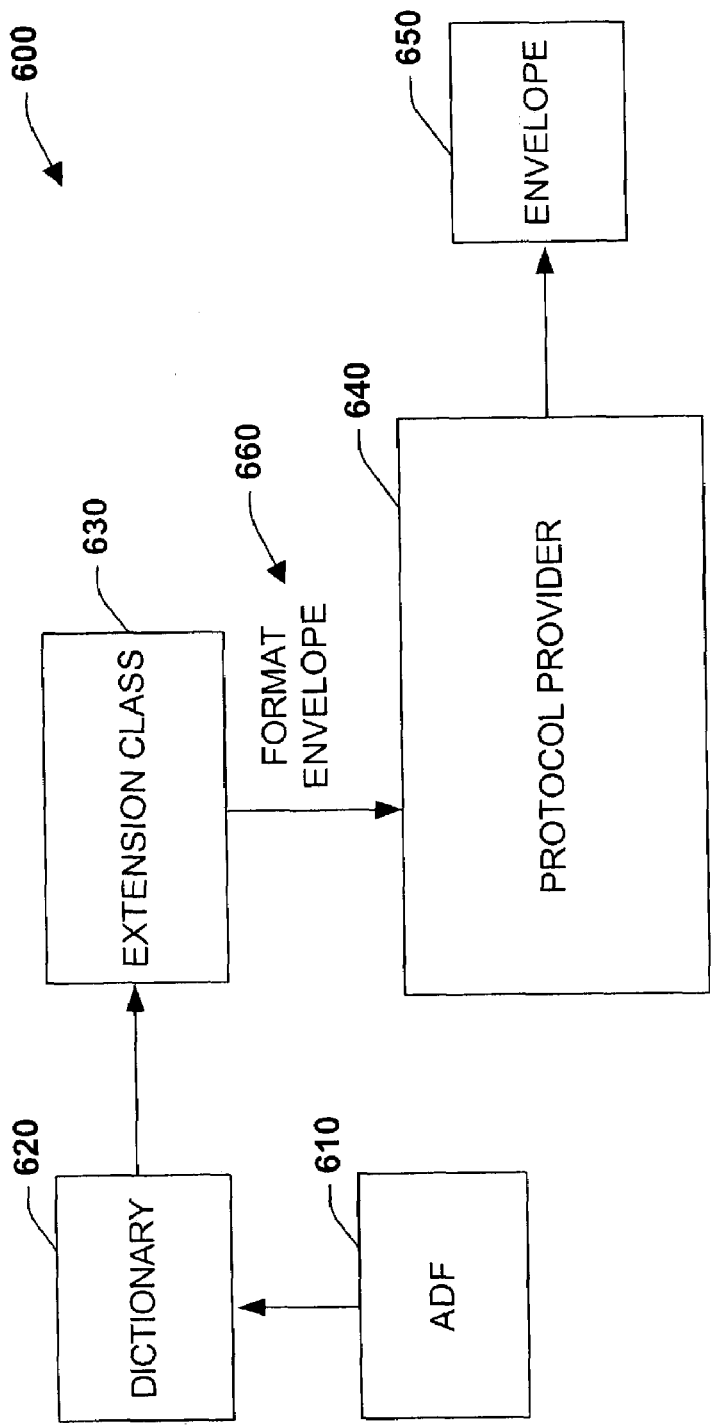
FIG. 6 is a diagram illustrating other extension class processing in accordance with an aspect of the present invention.

FIG. 6 is a system 600 illustrating other extension class processing in accordance with an aspect of the present invention. In this aspect, an Application Description File (ADF) 610 which is described below can be employed to populate a string dictionary 620 that is utilized by an extension class 630. The extension class 630 then invokes a protocol provider 640 to generate an envelope 650 via a format envelope method call illustrated at 660. In one example, the string dictionary 620 is passed to the Format Envelope method 660 and is populated with values specified in the ADF 610. The string dictionary 620 is passed through a deliver notification method or component (not shown) on an IHttpExtension interface associated with the extension class 630 and then processed by an IHttpProtocolProvider 640 to produce the envelope 650. Generally, the delivery channel ADF file elements specify a named protocol and are typically defined by a protocol designer. The following illustrates an example protocol specification:

```
<Protocols>
    <Protocol>
        <ProtocolName>customeName</ProtocolName>//the
        name assigned by the
        protocol developer
        <Fields>
            <Field>
                <FieldName>userDefinedl</
                FieldName>//optional defined by the
                protocol developer
                <Expression>a value </Expression>//and used by the content
//formatter to build the
//envelope
            </Field>
            ...etc...
        </Fields>
        <ProtocolExecutionSettings>
        </ProtocolExecutionSettings>
    </Protocol>
</Protocols>
```

Figure 7:
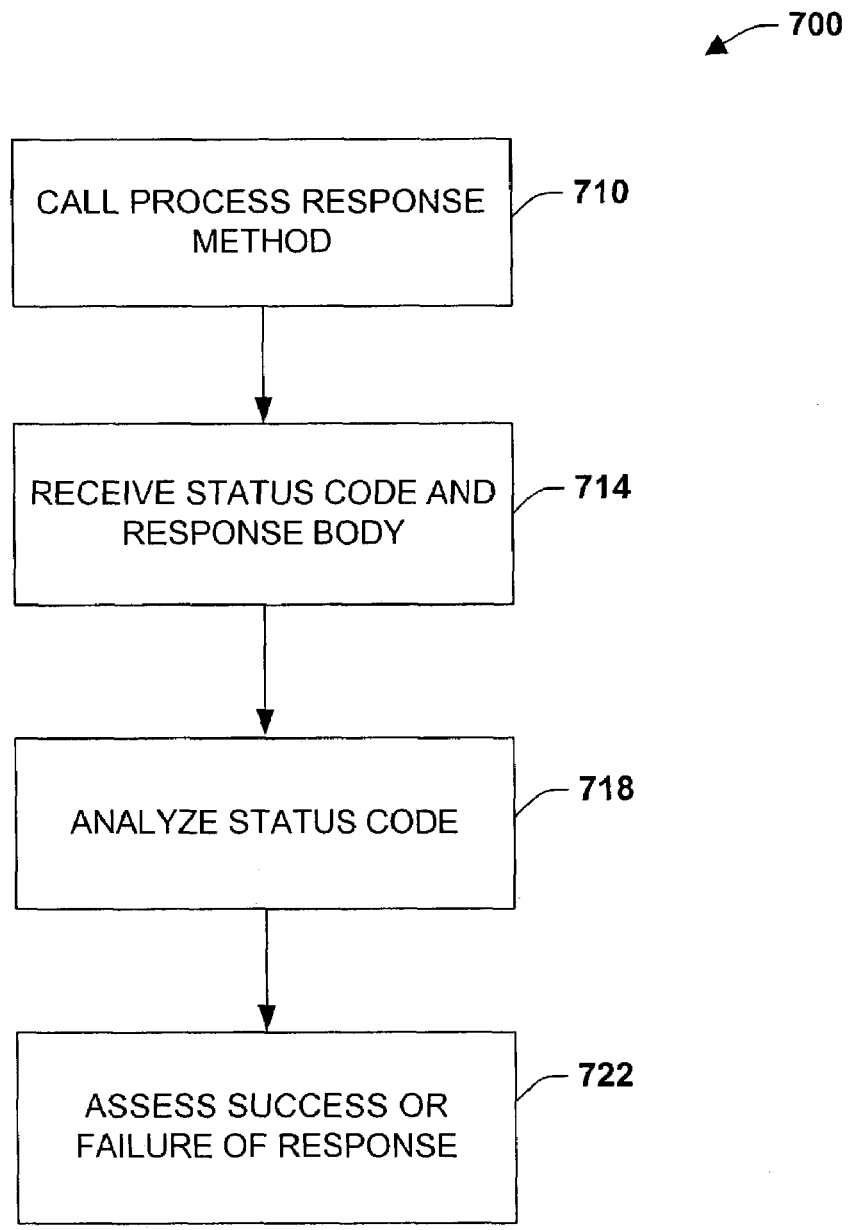
FIG. 7 is a flow diagram illustrating a response process in accordance with an aspect of the present invention.
Figure 8:
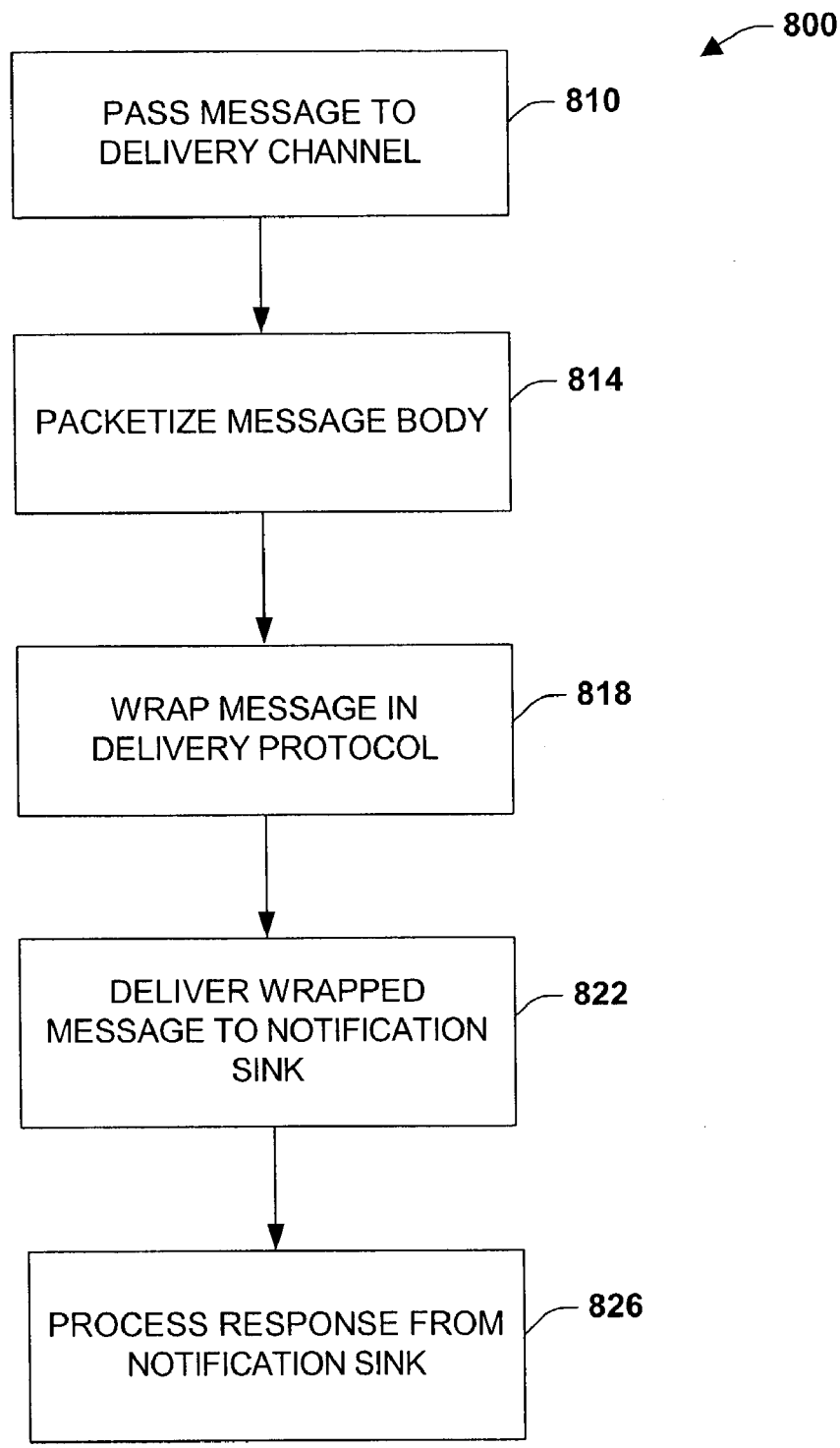
FIG. 8 is a flow diagram illustrating a protocol extension process in accordance with an aspect of the present invention.

FIGS. 7 and 8 illustrate methodologies for notification delivery processing in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 7 illustrates a response process 700 in accordance with an aspect of the present invention. The process 700 depicts typical response processing that may be employed when determining whether or not a message or notification was properly delivered and/or received. It is to be appreciated that other processing acts may also be employed such as error handling routines that analyze a message response and fire an event to provide notice that a message was not properly delivered. Other actions can include re-try operations, wherein messages are retransmitted a predetermined number of times before causing other error handling procedures such as notifying an administrator or log file that a message could not be routed to a desired location. Proceeding to 710, a process response method is called that is employed to determine whether a notification has been successfully delivered. At 714, the process response method receives a status code and a response body from the notification sink in which a message has been delivered, wherein the response body can include other information such as error status indicating why or where potential communications problems may have occurred. At 718, the received status code is analyzed for success. This can include testing a flag for a state to determine success or failure (e.g., flag set to 1 equals success, flag set to 0 equals delivery failure). At 722, success or failure of the response is assessed to determine other automated actions. For example, if a success status is determined, then the process may proceed back to another process to deliver or process more notifications. If a failure is determined, the process may attempt to re-deliver the failed message and/or initiate other error processing as noted above. The following is an example implementation of a response process:

```
///ProcessResponse allows the provider to do additional processing
after the HTTP post.
public bool ProcessResponse(
    System.Net.HttpStatusCode httpResponseCode,
    string       responseBody,
    bool         postSuccess)
{
    //
    // Save the HTTP response to a text file for examination
    //
    FileStream f = new FileStream("\\HTTPResponse.txt", FileMode.Create);
    StreamWriter s = new StreamWriter(f);
    s.WriteLine(responseBody)
    s.Close( );
    f.Close( );
    //
    //Read message id that comes back from MobileSys.
    //
    if(postSuccess)
    {
        StringReader stream = new StringReader(responseBody)
        XmlDocument xmlDocnew=XmlDocument( );
        xmlDoc.Load(stream);
        string messageId
        xmlDoc.SelectSingleNode("\\response/message/attribute::
        messageid").Value;
        //
        //add the message id to the table
        //
```

-continued

```
        AddMessage(messageId,
            "",        //message status code
            "",        //message status description
            "",        //message status text
            "",        //phone number
            DateTime.UtcNow.ToString( ), //created date
            DateTime.UtcNow.ToString( ) //last updated date
        );
        return postSuccess;
    }
    else
    return false;
    }
}
```

FIG. 8 illustrates a protocol extension process 800 in accordance with an aspect of the present invention. Proceeding to 810, a message is passed or handed off to a delivery channel. At 814, the message from 810 is packetized into a message body portion having one or more data packets. As noted above, the message body can include substantially any type of information such as messages, alerts, updates, postings, images, files, data structures, video, schemas, voice data, delivery information such as to addressee and from sender fields, time information, header fields, ID fields, subject fields, subscriber information, priority information relating to the urgency of a notification, and/or other information that can be encoded in substantially any data protocol (e.g., binary, XML, SQL, HTML, WML, SOAP, WSDL, XTML, and so forth). At 818, the message body from 818 is wrapped in a delivery protocol that can include substantially any protocol suitable for reception at a notification sink (e.g., HTTP, SMTP, FTP, TCP/IP, voice encoded extensions, video/image protocols, wireless protocols such as Wireless Mark-up Language (WML), authentication protocols, authorization protocols, security protocols such as SSL, IPSec, IKE, Kerberos, Diffie-Hellman protocols, tunneling protocols, encryption protocols, and/or other communications protocols).

It is also that some messages may be wrapped according to one delivery protocol whereas other messages are wrapped according to another delivery protocol depending on characteristics of the communications medium and/or notification sink and the target subscriber's preferences. At 822, the wrapped message is delivered to one or more notification sinks. After delivery, a process response is analyzed at 826 to determine the success or failure of the message delivery (e.g., analyze a flag or code that notifies delivery channel that message has or has not been suitably routed to notifications sink). As can be appreciated, the notification sink may be initially contacted to determine if a connection can be established before any message routing occurs. If not, an error may be returned automatically to the delivery channel to indicate a non-responsive channel. If an error occurs during message delivery, then an error code or status can be returned upon detection of a communications problem.

Figure 9:
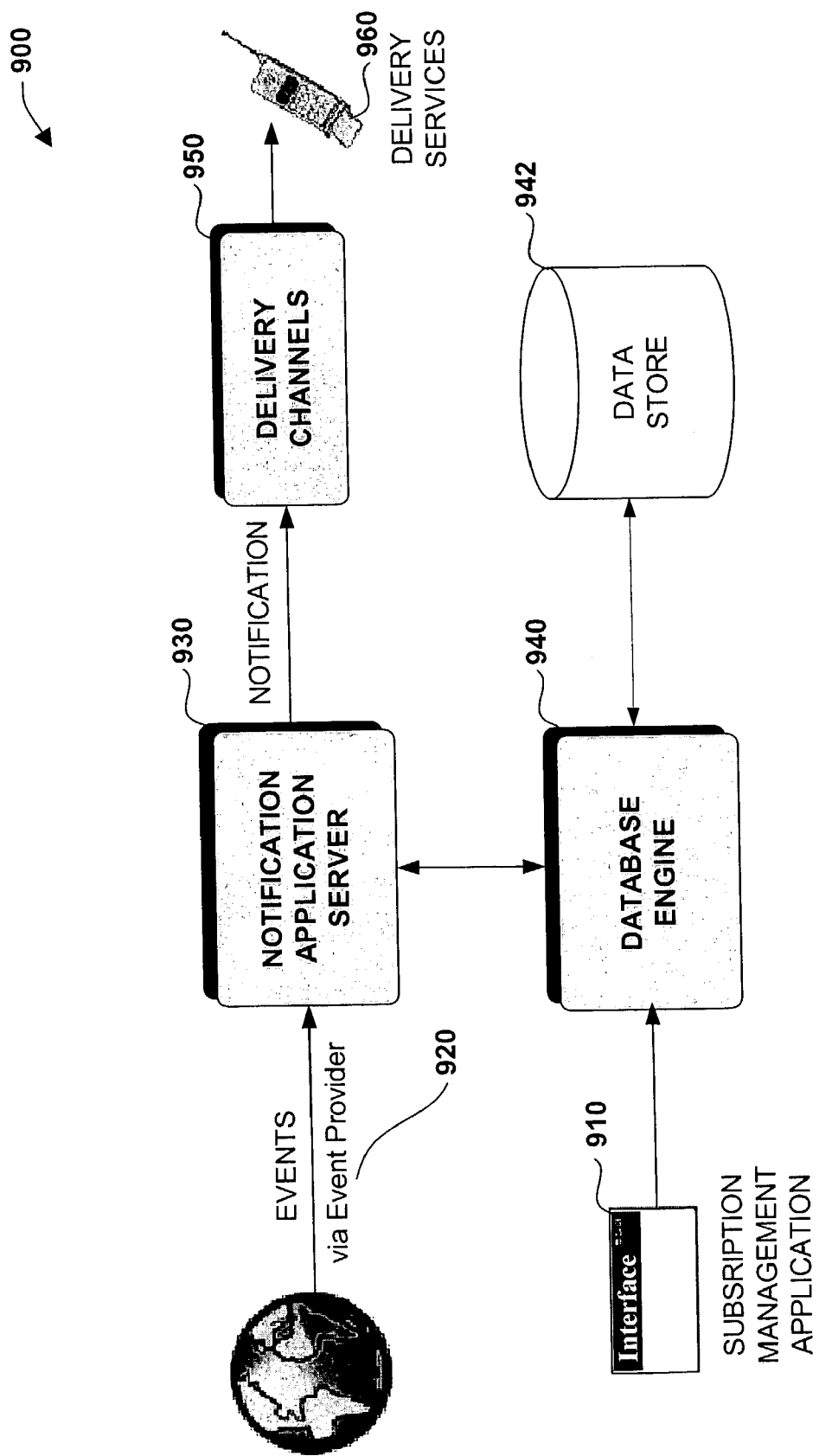
FIG. 9 is schematic block diagram of a notification application architecture in accordance with an aspect of the present invention.

Referring to FIG. 9, a system 900 illustrates a notification application architecture in accordance with one aspect of the present invention. The notification system 900 facilitates delivery of information to entities that have subscribed to an application. The system 900 provides for high-scalability and affords for disseminating information to subscribers in a desired manner according to specific subscriber preferences. A subscriber is an entity (e.g., a person or application) that has subscribed to the notification system 900. A subscription in accordance with the present invention can be an expressed interest in certain information (e.g., stock price or results of a sporting event), and the specification of a delivery mode (e.g., e-mail, voice mail, delivery via PDA, desktop computer, cellular telephone, television . . . ). Moreover, the present invention also provides for taking into consideration an individual's present state and associated delivery preferences according to present state. Thus, the notification system provides for dynamically modifying deliver modes given the type of information to be delivered, the criticality associated with the information, the subscriber's present state, and the deliver preferences given the aforementioned other parameters. One aspect of the invention that facilitates the system 900 providing such highly scalable notification services is the employment of modeling subscriptions as data. Such subscription modeling mitigates the need to run queries individually per event per subscriber. Accordingly, numerous events can be concurrently processed with respect to a plurality of subscribers and relevant notifications provided to the respective subscribers in a meaningful manner in accordance with individual subscriber preferences.

Information that subscribers are interested in is collected as events. For example, a stock price at a specific time can be an event, as is a sports score, or a product delivery message—almost any suitable real world "happening" can be expressed as one or more events in accordance with the subject invention. A notification is a message delivered to a subscriber-specific device that contains information related to a subscription. A notification might contain a message about a new high value for a specific stock or the final score for a sporting event for example. The server notification services provide interfaces for gathering subscriptions and events, and then produces notifications based on this data.

Instead of treating individual subscriptions as queries, the notification system 900 treats individual subscriptions as parameter data (e.g., an application developer can define a set of parameterized queries, each of which can be a subscription class)—evaluation of large numbers of subscriptions becomes a set-oriented data processing problem, for which database engines (e.g., SQL server) are well suited. This is a foundation of the notification system-programming framework of the present invention. In this model, event-triggered subscriptions are evaluated by simply executing a database join between events and a potentially large set of subscriptions. In general, the notion of modeling subscriptions as data is based on an assumption that if the notification system 900 defines various domains, then many queries will have a common structure. For instance, many subscribers are interested in stock values, but at a finer granularity respective subscribers desire information about different stocks at different values. Thus, an interest in a particular stock can be expressed as "STOCKSYMBOL" and "TRIGGERPRICE" so as to provide a common framework or parameter(s) for such information. The semantics of how these parameter values are interpreted in relation to the event data can be defined by the application. Thus, the application fixes the logic of how subscription parameters are interpreted (e.g., one app may want to alert when current price >trigger price and another may want to alert when current price <trigger price)—such semantics can be resolved in advance by the application developer, and designed such that a subscriber cannot introduce new semantics.

As discussed in greater detail below, the subject invention also encompasses a programming model for building subscription applications. In subscription applications a user establishes subscriptions or declarations of interest in certain kinds of targeted information. Thereafter, when the information becomes available, the subscription application sends a notification to the subscriber. A function of a subscription application is to match incoming data with the set of user subscriptions to determine what notifications need to be delivered. The subject programming model allows an application developer to write a small amount of application specific code (e.g. a mix of XML, SQL, C#, C++, VB and other languages suitable for support by the NET framework) to build a fully-functional, rich subscription application. To enable such functionality, an execution engine can be built on top of SQL Server and the NET frameworks, for example, that implements fundamental data constructs and execution semantics common to subscription applications. Thus, the subject programming model reduces development time, facilitates application maintenance and increases application efficiency by leveraging the power of a server, for instance SQL Server, to do subscription and event matching.

The subject invention includes a declarative programming model for building subscription applications. The programming model provides a base framework for the structure of applications; and a developer can adapt the base framework to build a specific application.

With respect to the high-level schematic illustration of the system 900, five components of notification services cooperate to provide the functionality described above. A subscription management application 910 provides an interface for subscribers to submit subscriptions as input to the system 900. In particular, the subscription management application 910 provides numerous application programmer interfaces (APIs) that facilitate entities to provide subscription services via the system 900—the APIs are discussed in greater detail infra. Event data can also gathered from external sources via an event provider 920. For example, an event provider in accordance with the present invention can gather or be pushed relevant events from a plurality of resources (e.g., newspapers, magazines, websites, libraries, individuals, employers, government(s), etc.). A database engine 940 stores events and/or subscriptions in a data store 942, and also runs statements, like Transact-SQL statements, and stored procedures. It is to be appreciated that the database engine 940 can also process events versus subscriptions in real-time without persistently storing information. A notification application server 930 processes subscriptions based on a set of events and ultimately generates notifications that are delivered to subscribers, and which can be stored in the database 942 if desired. Finally, delivery channels 950 route the generated notifications to delivery services 960, which can include, but are not limited to, Exchange servers, SMS servers, and .NET Alert Web services.

Figure 10:
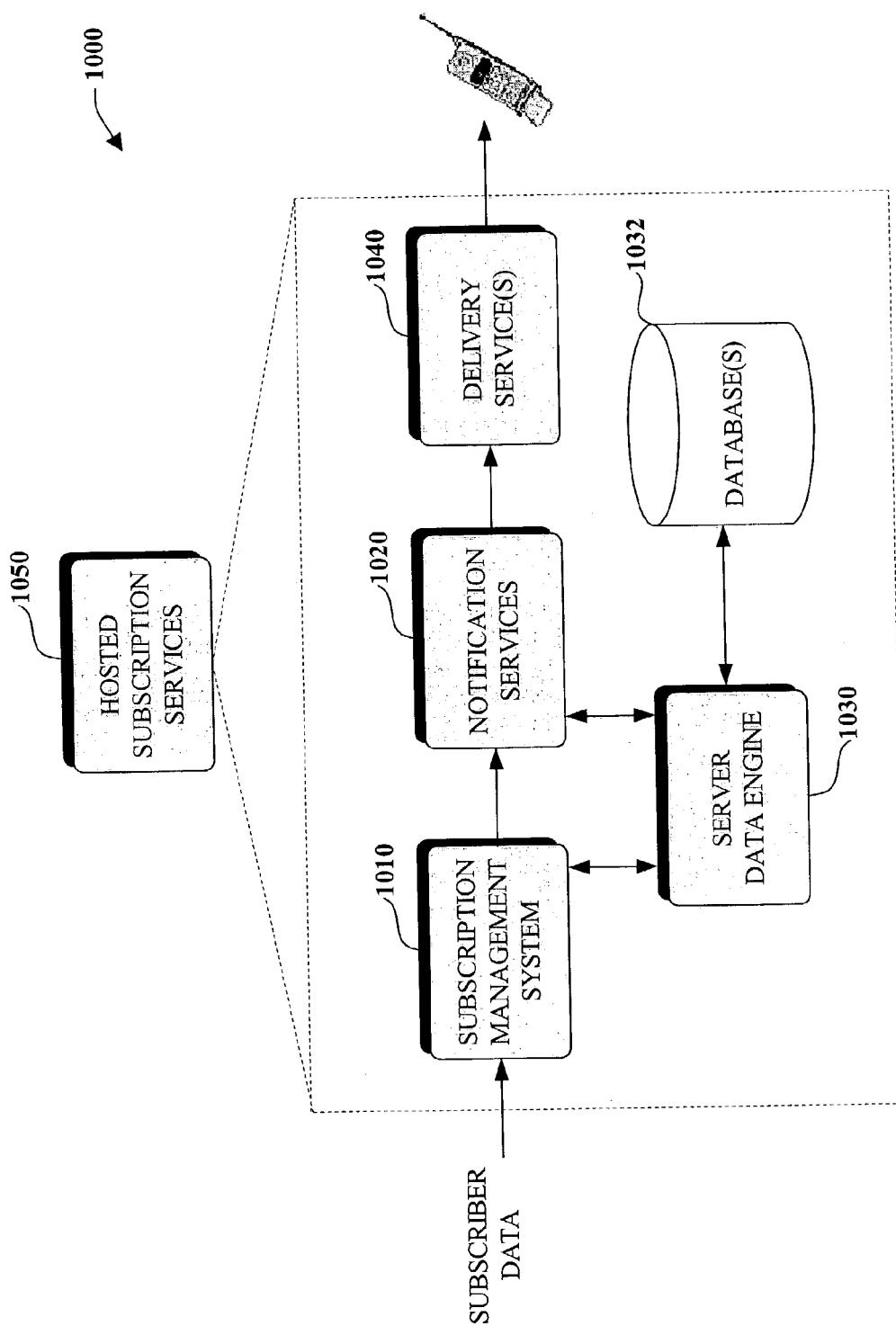
FIG. 10 is a schematic block diagram of a notification creation and distribution system in accordance with an aspect of the present invention.

FIG. 10 illustrates a notification creation and distribution system 1000 in accordance with an aspect of the present invention. The system 1000 includes a subscription management system (one or more subscription management applications) 1010, notification services 1020, a data engine 1030, database(s) 1032, delivery services 1040, and one or more subscription services 1050 hosted by the notification system 1000. The server database engine 1030 provides for processing and storing instance and application data. In particular, the server database engine 1030 stores and retrieves instance and application information from database(s) 1032. The data.engine 1030 also provides other services employed by the notification services 1020. For example, the notification services 1020 can employ Transact-SQL language to join event and subscription data via the data engine 1030. Such integration provides scalable performance gains, because the data engine 1030 is likely to be highly optimized for joins as a result of the information processing capabilities afforded by SQL services. The subscription management system 1010, provides a hosting environment for user interfaces that collect subscriber and subscription data as well as accommodate a variety of unique subscription services 1050. The subscription management system can employ a Windows® application for submitting subscriber and subscription data, or can use an automated process for loading subscriber and subscription data from another system. The delivery services 1040 (e.g., .NET Alerts and Microsoft Exchange Server) receive notifications from the notification services 1020 and send the notifications to appropriate subscribers.

Functionally, events are submitted to the server data engine 1030 through a hosted event provider in notification services 1020, or through a non-hosted event provider outside of notification services. If employing a non-hosted event provider, another system may be used that supports the event provider, such as a Web server. In addition, it is appreciated that the notification services 1020 can be deployed on a single server or scaled across multiple servers.

Figure 11:
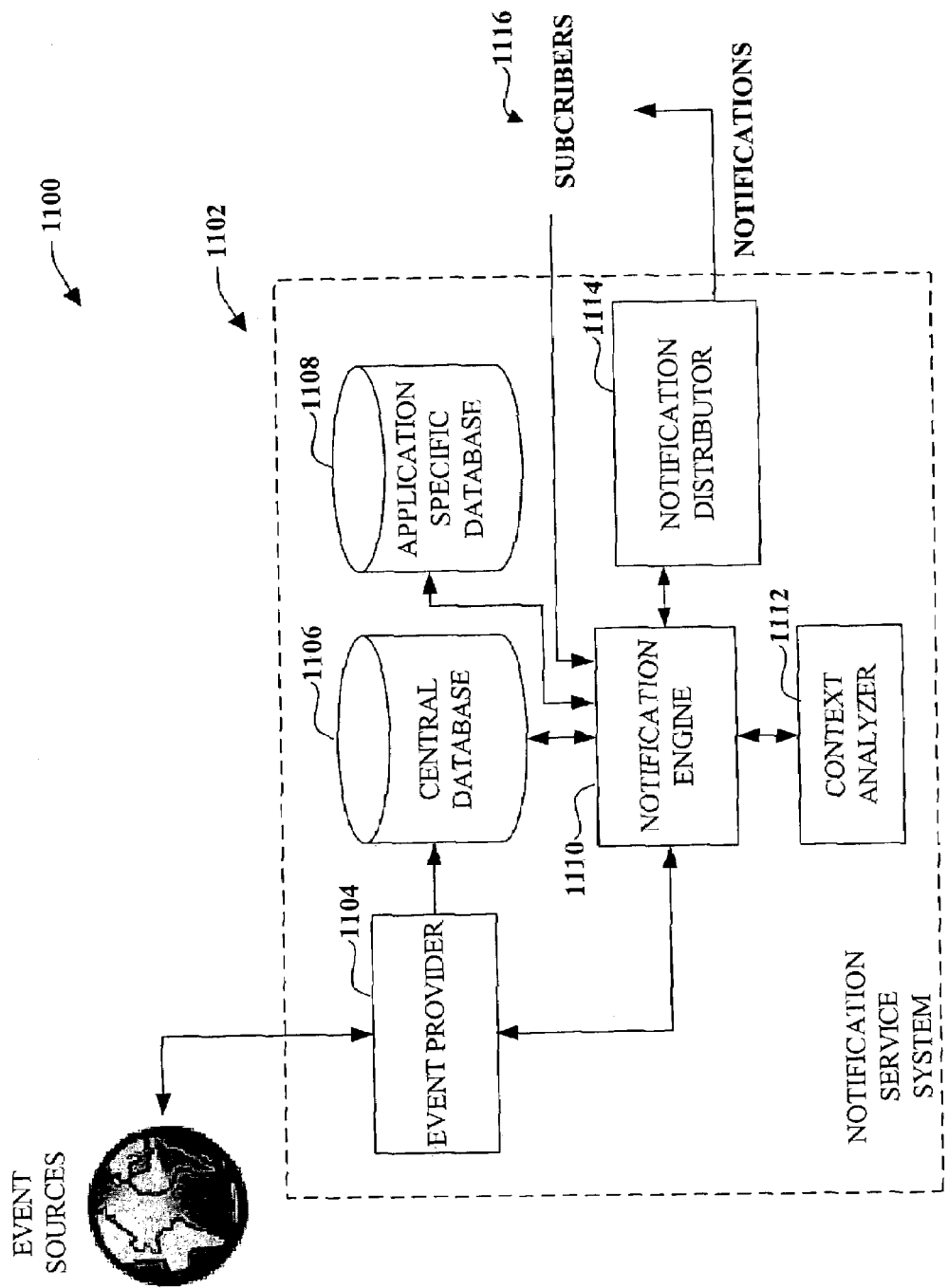
FIG. 11 is a schematic block diagram illustrating a notification service architecture in accordance with an aspect of the present invention.

Referring next to FIG. 11, a notification service architecture 1100 is illustrated in accordance with an aspect of the present invention. The architecture 1100 includes a notification services system 1102, which includes an event provider 1104, a central database 1106, an application-specific database 1108, notification engine 1110, context analyzer 1112, notification distributor 1114, and subscribers 1116. The notification services system 1102 receives input in the form of events and subscriber data, and supplies output or notification to subscribers 1116.

The event provider 1104 acquires events from event sources for the notification services system 1102. Events represent data changes in the external world. For example, a stock price at a specific time is an event, as is a sports score, or a product delivery message. Stated differently, events are items that are potentially interesting to some set of users, and such set of users define the particular input data via subscriptions. The event provider 1104 is employed to collect selected events from event sources for the notification services 1102. Moreover, the event provider 1104 can collect event data from a plurality of different sources including but not limited to communications, such as Internet and network-based communications, and telephony communications, as well as software services, XML files, applications, and databases.

Event sources are defined generally herein as that which generates events, which can also be referred to as notifications or alerts, intended to alert a user, or a proxy for the user, about information, services, and/or a system or world event. An event source can also be referred to as a notification source. Furthermore, the event provider 1104 can monitor and gather data through various methods. Exemplary methods of gathering data include but are not limited to, monitoring directories for file additions, checking system and application log files for certain types of entries, trapping alerts from applications, monitoring web pages, tracking changes in database tables, and reviewing data provided by web services. In most cases, an event provider can gather data from any suitable resource, provided that an application is prepared that retrieves events from the resource. In general, there are a variety of different models that can be employed by the event provider 1104 to collect data. These models can influence how often and under what circumstances the event provider 1104 will collect events from event sources.

In addition, the event provider 1104 can be notified or provided with data in at least one of two manners. The event provider 1104 may wait for information to be "pushed" or sent to it, or it can "pull" information from a source by polling the source and gathering any new or updated data. For example, if a user desires to be notified each time a headline story on a favorite news page changes, the event provider 1104 can be implemented so that it monitors that page and searches for changes to the headline text, for example. When the text changes, the event provider 1104 can extract the new headline data for the notification services system 1102. In the above example, the event provider 1104 is responsible for gathering needed data, because the data is not provided to the event provider from the event source as would be the case with employment of a push methodology.

Furthermore, the event provider 1104 can obtain new data for the notification system 1102 based on either a schedule or on the occurrence of an event that meets pre-defined criteria. A scheduled event provider can run periodically, based on settings implemented by an application developer. The scheduled event provider will start running, retrieve and submit new event data and then hibernate until a next scheduled trigger time. An event-driven event provider can monitor an event source by running continuously. Thereafter, when data that meets a particular criteria for collection is made available the event provider will collect and submit the event. Alternatively, an event-driven event provider may only run in response to a callback function or some other external stimulus. This external function would then determine whether there is valid event data to collect, and use the event provider as the means of collecting such data. Once the event provider 1104 collects data from an external event source, it writes the data to an event table in batches and saves the event table to database 1108.

Data is preferably handled in batches for the sake of efficiency—event data and notification data are both batched. A batch, as generally defined herein, can be a set of data processed as a group. For example, an event batch can be a set of events that are submitted to notification services 1102 at one time. Events can be written to the system either individually or as a group. When a single event is written to the system and there is not an event batch open, one can be created automatically. The new event and subsequent events are then associated with this automatically created batch. The event provider that is providing these events is programmed to close the current event batch periodically, which submits this batch of events for use in notification generation. A new event batch is then created with the first new event submission, and the cycle starts again. Furthermore, when events are written to the system as a group, each group is automatically assigned an event batch. When the writing process is completed, the event batch is closed so that these events are available for notification generation processes. In one particular embodiment of the invention, the batches are atomic (e.g., either the entire batch or none of it is submitted).

Figure 12:
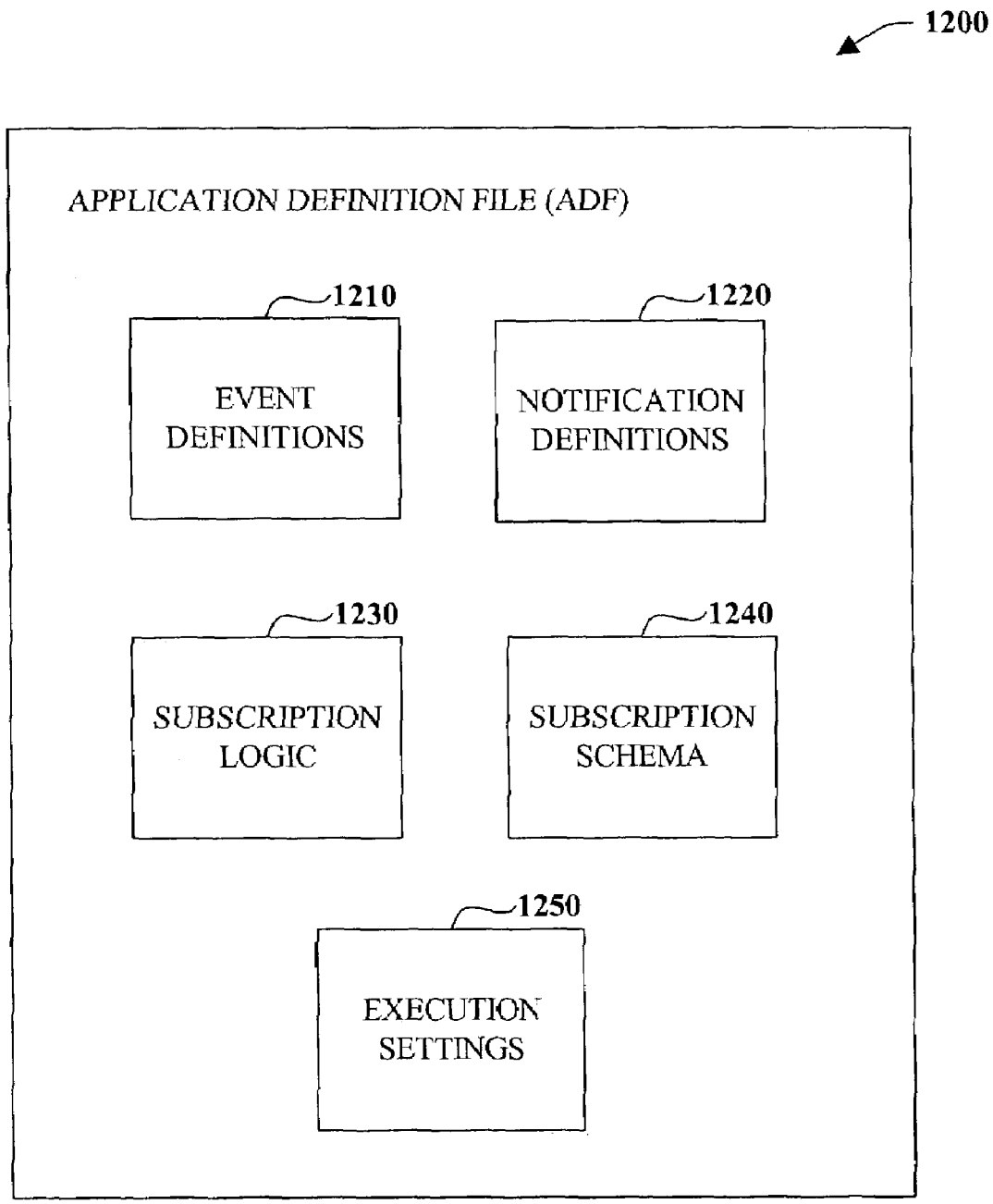
FIG. 12 is a block diagram depicting an Application Definition File (ADF) and its components in accordance with an aspect of the present invention.

Turning to FIG. 12, a block diagram depicting an ADF 1200 and its components is illustrated in accordance with an aspect of the present invention. The ADF 1200 defines central logic of the application and contains schemas for events, subscriptions, and notifications; the rules for matching events with subscriptions; and may provide the name of the file used to format generated notifications. The ADF 1200 generally includes five components: event definitions 1210, notification definitions 1220, subscription logic 1230, subscription schema 1240 and execution settings 1250. It is to be appreciated that the functionality of the various components can be combined into a lesser number of components or extrapolated into a larger set.

The event definitions 1210 specify structure of event data, the event providers that collect the data, and the structure of any event chronicles used by the application. The notification definitions 1220 specify the structure of raw notification data, the formatting for the messages that will be sent to subscribers, and the delivery protocols used to send the messages. The subscription logic 1230 defines how subscriptions are evaluated. Transact-SQL statements, for example, may match subscriptions to events, or evaluate subscriptions at certain recurring times. Additionally, subscription logic 1230 can be parameterized in a well-defined manner, so that individual subscriptions can personalize the subscription logic. Further, the subscription schema 1240 defines the structure of the subscription parameters, and evaluation times define when subscriptions are to be evaluated. Finally, the execution settings 1250 allow an application developer to enhance behavior and performance of the application when executed by notification services.

Additionally, the application developer may define application settings in several sections of the application definition file (ADF). These settings specify such items as the machines that host notification services, and execution schedules for notification services functions—they also document metadata about the ADF itself. This includes the structure of the events and subscriptions that the application accepts as input, and the structure of the notifications it produces. Examples of such metadata, described in detail below, include but are not limited to generator settings, distributor settings, vacuuming, version settings, notification history, application database information, application executing settings, and distributor information.

The notification services component 1020 (FIG. 10) includes a generator component (not shown) within the notification engine 1110 (FIG. 11) that matches events to subscriptions and ultimately produces notifications. Generator setting considerations may be defined in a <Generator> node in the ADF. One consideration that should be taken into account is how many threads the generator may use to process event batches. Such a factor can be considered a trade-off between improving application speed and monopolizing system resources. Part of such consideration is evaluating how much benefit can be gained by adding more threads. It is appreciated that some operations do not lend themselves to better efficiency through parallelism and may sometimes become less efficient. To indicate this information, a value can be specified for in a <ThreadPoolSize> element in the <Generator> node.

Functionally, the notification services generator attempts to execute event chronicle rules in parallel, followed by subscription rules (both event rules and scheduled rules). The generator will attempt to utilize threads available within the thread pool while executing rules. However, it should be noted that the generator should not execute event chronicle rules in parallel.

Figure 13:
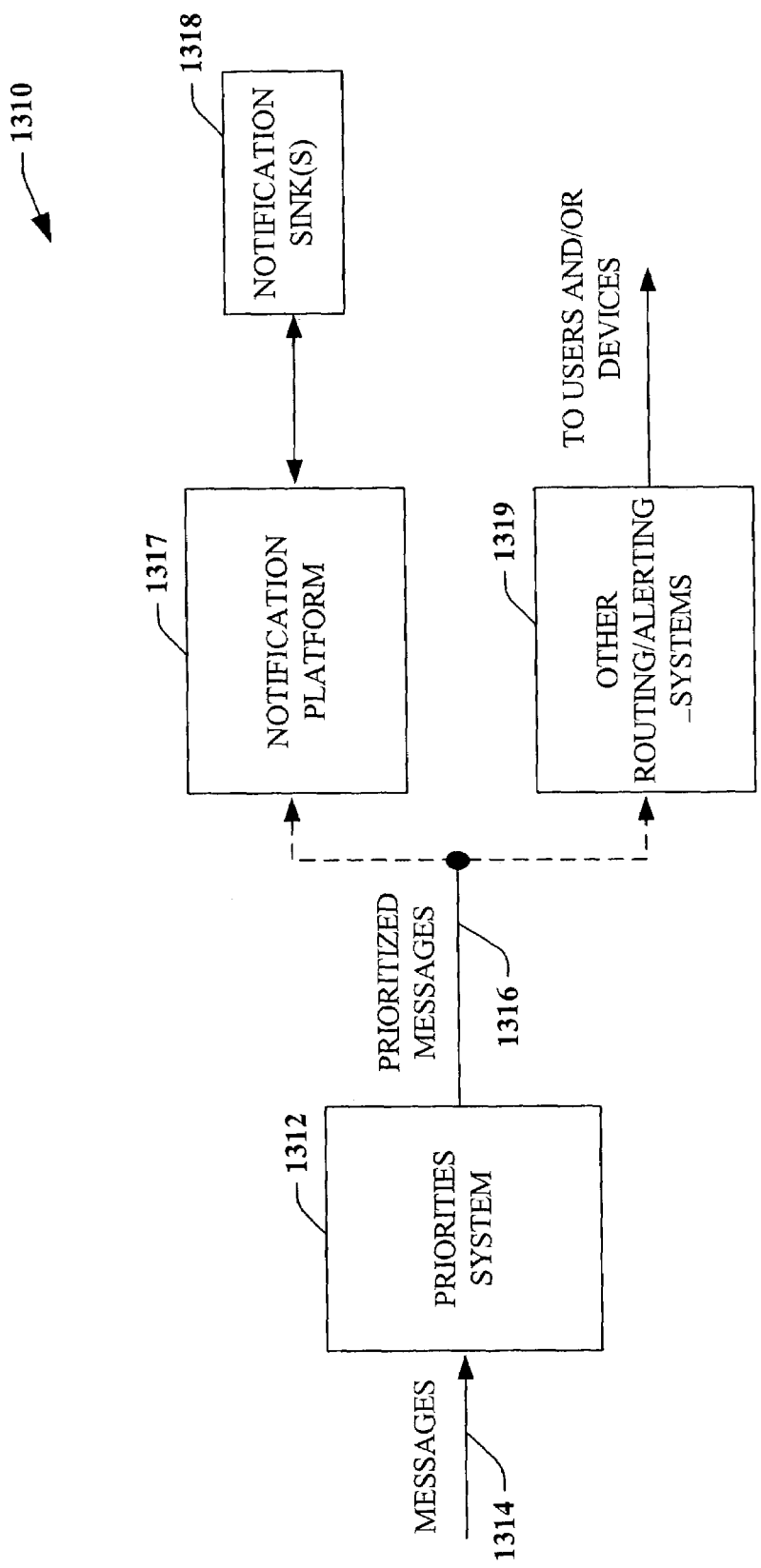
FIG. 13 is a schematic block diagram of a priorities system in accordance with an aspect of the present invention.

Referring to FIG. 13, a system 1310 illustrates a priorities system 1312 and notification architecture in accordance with an aspect of the present invention. The priorities system 1312 receives one or more messages or notifications 1314, generates a priority or measure of importance (e.g., probability value that the message is of a high or low importance) for the associated message, and provides the one or more messages with an associated priority value at an output 1316. As will be described in more detail below, classifiers can be constructed and trained to automatically assign measures of priorities to the messages 1314. For example, the output 1316 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 1317 can be employed in conjunction with the priorities system 1312 to direct prioritized messages to one or more notification sinks accessible to users. As will be described in more detail below, the notification platform 1317 can be adapted to receive the prioritized messages 1316 and make decisions regarding when, where, and how to notify the user, for example. As an example, the notification platform 1317 can determine a communications modality (e.g., current notification sink 1318 of the user such as a cell phone, or Personal Digital Assistant (PDA)) and likely location and/or likely focus of attention of the user. If a high importance e-mail were received, for example, the notification platform 1317 can determine the users location/focus and direct/reformat the message to the notification sink 1318 associated with the user. If a lower priority message 1316 were received, the notification platform 1317 can be configured to leave the e-mail in the user's in-box for later review as desired, for example. As will be described in more detail below, other routing and/or alerting systems 1319 may be utilized to direct prioritized messages 1316 to users and/or other systems.

Figure 14:
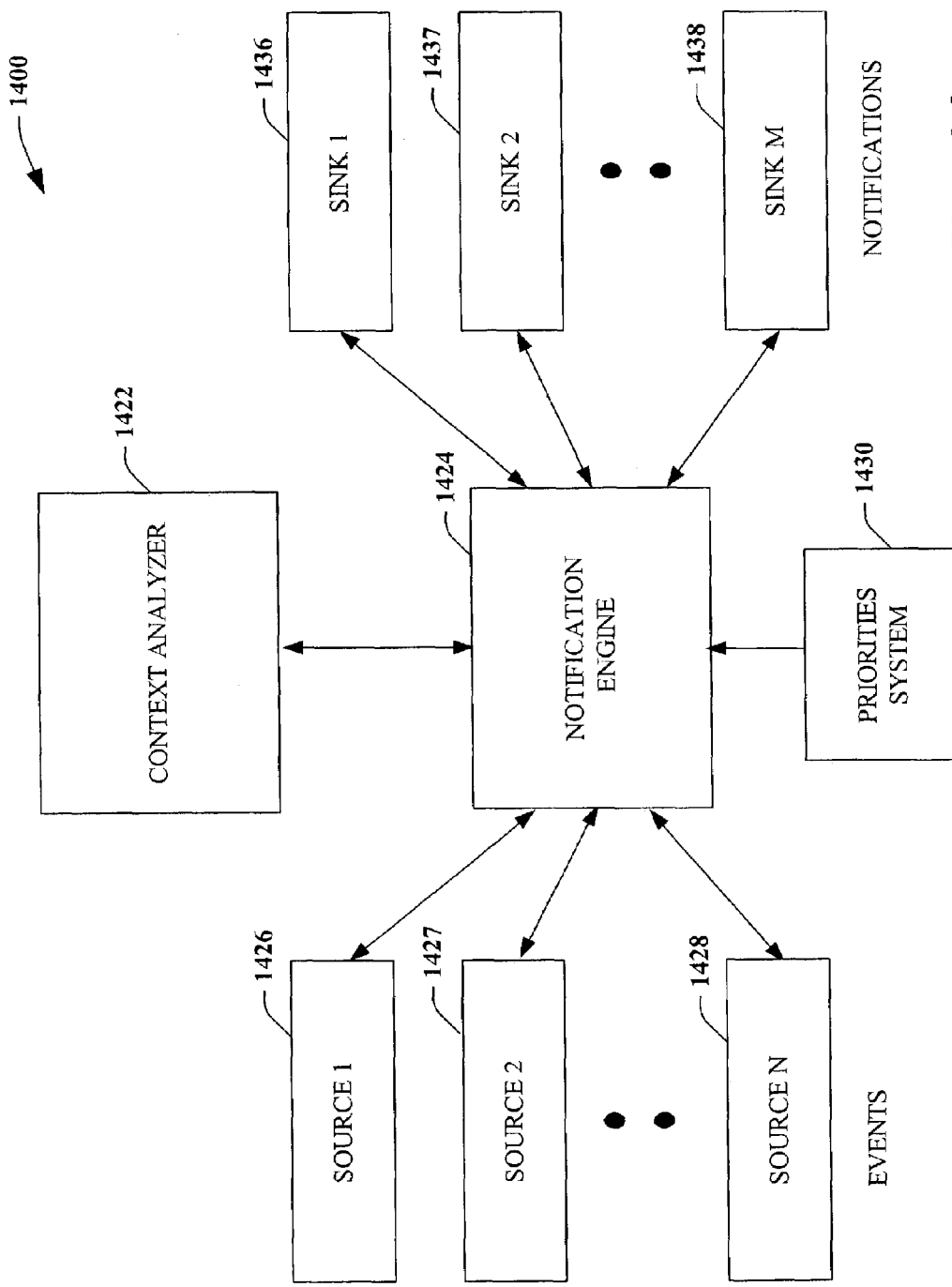
FIG. 14 is a schematic block diagram illustrating systematic cooperation between a notification engine and a context analyzer according to an aspect of the present invention.

Turning now to FIG. 14, a system 1400 illustrates how the notification engine and context analyzer function together according to an aspect of the present invention. The system 1400 includes a context analyzer 1422, a notification engine 1424, one or more notification sources I through N, 1426, 1427, 1428, a priorities system 1430, which can operate as a notification source, and one or more notification sinks, I through M, 1436, 1437, 1438, wherein N an M are integers, respectively. The sources are also referred to as event publishers, while the sinks are also referred to as event subscribers. There can be any number of sinks and sources. In general, the notification engine 1424 conveys notifications, which are also referred to as events or alerts, from the sources 1426-1428 to the sinks 1436-1438, based in part on parametric information stored in and/or accessed by the context analyzer 1422.

The context analyzer 1422 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 1424, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 1422, according to one aspect of the present invention is inclusive of contextual information determined by the analyzer. The contextual information is determined by the analyzer 1422 by discerning the user's location and attentional status based on one or more contextual information sources (not shown), as is described in more detail in a later section of the description. The context analyzer 1422, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 1426-1428, 1430 generate notifications intended for the user and/or other entity. For example, the sources 1426-1428 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 1430 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 1426-1428 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and/or,
information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 1436-1438 are able to provide notifications to the user. For example, such notification sinks 1436-1438 can include computers, such as desktop and/or laptop computers, handheld computers, cell phones, landline phones, pagers, automotive-based computers, as well as other systems/applications as can be appreciated. It is noted that some of the sinks 1436-1438 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 1424 accesses the information stored and/or determined by the context analyzer, and determines which of the notifications received from the sources 1426-1428 to convey to which of the sinks 1436-1438. Furthermore, the notification engine 1424 can determine how the notification is to be conveyed, depending on which of the sinks 1436-1438 has been selected to send the information to. For example, it may be determined that notifications should be summarized before being provided to a selected sinks 1436-1438.

The invention is not limited to how the engine 1424 makes its decisions as to which of the notifications to convey to which of the notification sinks, and in what manner the notifications are conveyed. In accordance with one aspect, a decision-theoretic analysis can be utilized. For example, the notification engine 1424 can be adapted to infer important uncertainties about variables including a user's location, attention, device availability, and amount of time until the user will access the information if there were no alert. The notification engine 1424 can then make notification decisions about whether to alert a user to a notification, and if so, the nature of the summarization and the suitable device or devices to employ for relaying the notification. In general, the notification engine 1424 determines the net expected value of a notification. In doing so, it can consider the following:

- the fidelity and transmission reliability of each available notification sink;
- the attentional cost of disturbing the user;
- the novelty of the information to the user;
- the time until the user will review the information on his or her own;
- the potentially context-sensitive value of the information; and/or,
- the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 1424 can make decisions as to one or more of the following:

- what the user is currently attending to and doing (based on, for example, contextual information);
- where the user currently is;
- how important the information is;
- what is the cost of deferring the notification;
- how distracting would a notification be;
- what is the likelihood of getting through to the user; and,
- what is the fidelity loss associated with the use of a specific mode of a given notification sink.

Therefore, the notification engine 1424 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 1424 can access information stored in a user profile by the context analyzer 1422 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 1424 determines how and whether to notify the user.

According to one aspect of the present invention, the notification platform architecture 1400 can be configured as a layer that resides over an eventing or messaging infrastructure. However, the invention is not limited to any particular eventing infrastructure. Such eventing and messaging systems and protocols can include:

- HyperText Transport Protocol (HTTP), or HTTP extensions as known within the art;
- Simple Object Access Protocol (SOAP), as known within the art;
- Windows Management Instrumentation (WMI), as known within the art;
- Jini, as known within the art; and,
- substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 15:
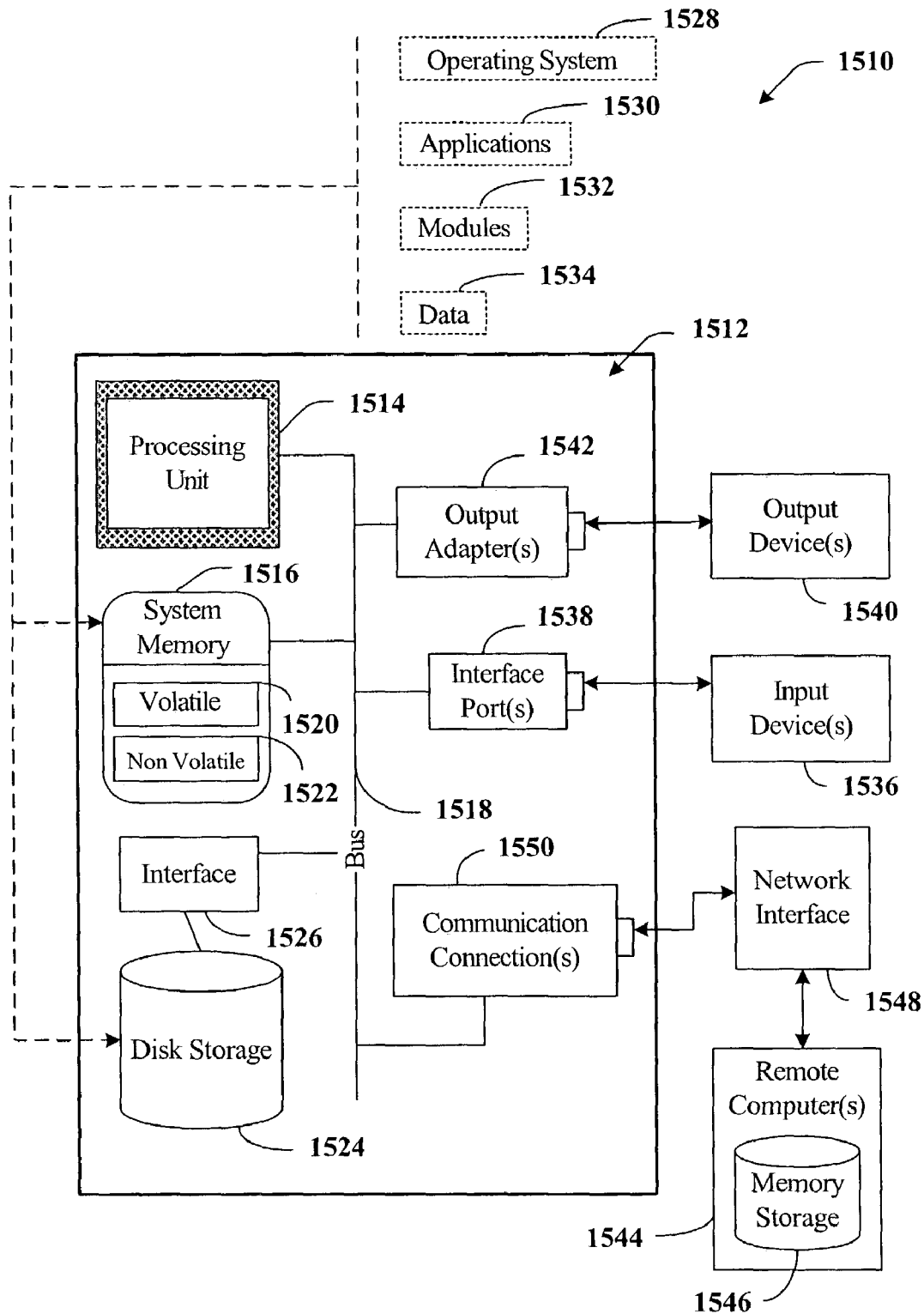
FIG. 15 is a schematic block diagram illustrating a suitable operating environment in accordance with an aspect of the present invention.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM(DRRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

Figure 16:
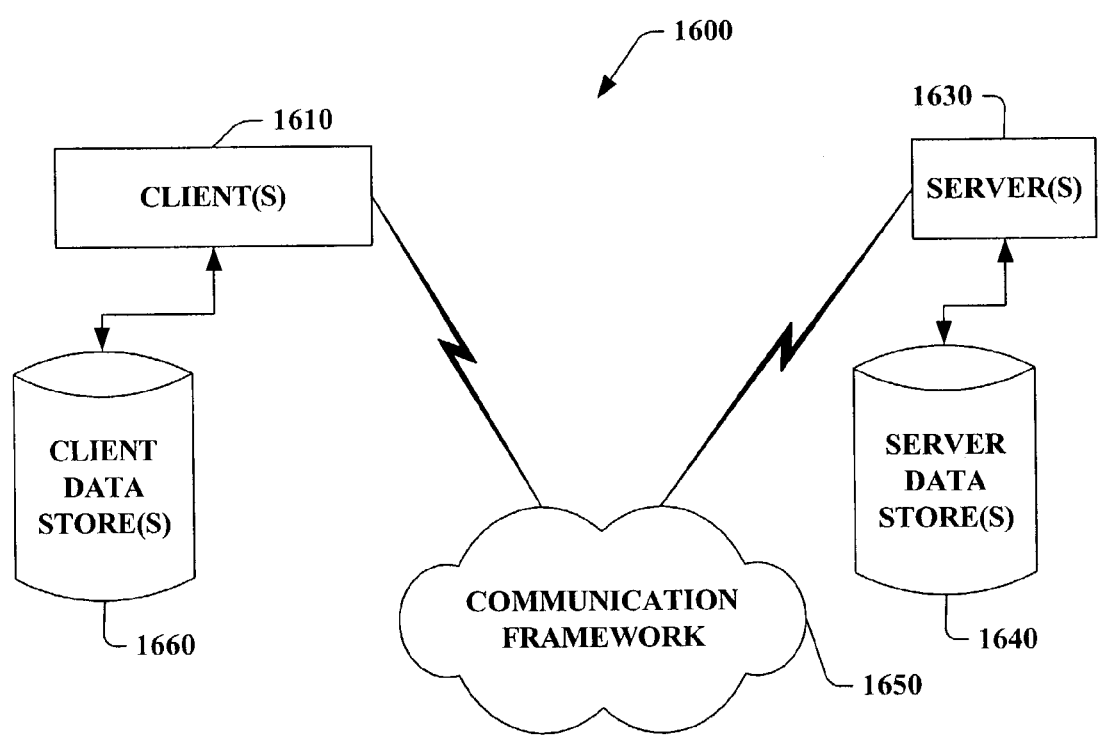
FIG. 16 is a schematic block diagram of a sample-computing environment with which the present invention can interact.

FIG. 16 is a schematic block diagram of a sample-computing environment 1600 with which the present invention can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads) processes, computing devices). The servers 1630 can house threads to perform transformations by employing the present invention, for example. One possible communication between a client 1610 and a server 1630 may be in the form of a data packet adapted to be transmitted between two or more computer processes. The system 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A notification system embodied on at least one of a system memory or a computer storage media comprising the following components executing on one or more processors:

at least one delivery channel for delivering notifications in accordance with a notification platform;

an extension component associated with the at least one delivery channel to format the notifications according to communications characteristics of at least one notification sink, the at least one notification sink is selected based on an inferred likelihood of being a notification recipient's preferred notification sink, the inferred likelihood of being a notification recipient's preferred notification sink is based upon the recipient's contextual information and net expected values of the notifications to the recipient, wherein the contextual information is based on at least one of the user's current location, user's state of attention, user's current activity, or notification sink currently available to the user, wherein the net expected value is based at least upon cost of disruption to the user in the user's current state of attention by employing the one or more notification sinks and the context sensitive value of the information; and at least one SQL server to distribute information from one or more event sources that generate notifications to the at least one notification sink that receives information from the event sources, wherein the at least one SQL server processes a plurality of event sources and performs join operations to distribute notifications to the at least one notification sink.

2. The system of claim 1, further comprising at least one subscription that is obtained to determine which of the event sources cause automated notifications to occur at the at least one notification sink.

3. The system of claim 1, the at least one delivery channel is associated with a platform interface that facilitates delivery of notification events.

4. The system of claim 3, the at least one delivery channel includes a socket interface component providing a delivery protocol for routing messages to the at least one notification sinks.

5. The system of claim 3, the extension component facilitates operation of the delivery channel by at least one of exposing or inheriting features of the platform interface that are called when delivering notifications to the at least one notification sink.

6. The system of claim 1, the extension component includes automated formatting and delivery options for routing messages through the delivery channel.

7. The system of claim 6, the extension component posts a message that is routed to a URL address.

8. The system of claim 6, the extension component automatically generates protocol packets that wraps message in a delivery protocol in order to present the message in a suitable form at the at least one notification sink.

9. The system of claim 1, the at least one delivery channel include transmission of formatted notifications to one or more recipients at a delivery target, the delivery targets including at least one of a desktop target, a mobile target, or a service target.

10. The system of claim 1, the at least one delivery channel creates a formatted message utilizing parameterized data then invokes a delivery class provided by an operating system to transport the message to an intended recipient.

11. The system of claim 1, the at least one delivery channel is configured via at least one of an Application Description File (ADF) or a Notification Platform configuration file.

12. The system of claim 1, at least one of the delivery channel and the extension component employ a communications protocol to deliver information to the at least one notification sink, the communications protocol includes at least one of HTTP, SMTP, FTP, TCP/IP, voice encoded extensions, video protocols, image protocols, wireless protocols, Wireless Mark-up Language (WML) protocols, authentication protocols, authorization protocols, security protocols, SSL, IPSec, IKE, Kerberos, Diffie-Hellman protocols, tunneling protocols, asynchronous protocols, routing protocols, XML protocols, WSDL protocols, or SOAP protocols.

13. The system of claim 1, the notification platform includes at least one of a message queuing function or a Distributed Transaction Coordinator (DTC) function.

14. The system of claim 1, the extension component facilitates processing a notification as a message body and packetizing the message body within a transmission envelope.

15. The system of claim 14, the message body contains information generated from an event source that is to be delivered to a notification sink, the information includes at least one of alerts, updates, postings, images, video, voice data, delivery information, time information, header fields, ID fields, subject fields, subscriber information, or priority information relating to the urgency of a notification.

16. The system of claim 1, further comprising a protocol formatter to format the notifications and a response parser to analyze whether a notification was delivered to the at least one notification sink.

17. The system of claim 1, the extension component is provided as a class supporting one or more protocol object declarations.

18. The system of claim 1, the at least one delivery channel is configured via a configuration file, the configuration file including at least one of a channel name, a protocol name, an argument, a dll assembly, a protocol provider class name, a user name, a password, a domain name, a group name, a connection limit, a shutdown value, a port name, a server name, a content type, an encoding type, or a Universal Resource Locater (URL) field.

19. The system of claim 1, further comprising a context component that updates at least one of a local or a remote database with information relating to at least one user's current state, the current state employed to deliver the notifications.

20. A notification system embodied on at least one of a system memory or a computer storage media executing on one or more processors, comprising:
  means for encoding at least one notification within a message body;
  means for wrapping the message body in a transmission envelope;
  means for delivering the transmission envelope to one or more notification sinks that receive the at least one notification, the one or more notification sinks are selected among a plurality of notification sinks based upon an inferred likelihood of being a notification recipient's preferred notification sink, the inferred likelihood of being a notification recipient's preferred notification sink is based upon the recipient's contextual information and net expected values of the notifications to the recipient, wherein the contextual information is based on at least one of the user's current location, user's state of attention, user's current activity, or notification sink currently available to the user, wherein the net expected value is based at least upon cost of disruption to the user in the user's current state of attention by employing the one or more notification sinks and the context sensitive value of the information; and
  means to distribute information from one or more event sources that generate notifications to the one or more notification sinks, wherein the means processes a plurality of event sources and performs join operations to distribute notifications to the one or more notification sinks.

21. The system of claim 20, the means for wrapping includes a packetized data structure.

22. The system of claim 21, the packetized data structure is in a different data protocol from the message body.

23. The system of claim 21, the packetized data structure is in a similar data protocol to the message body.

24. The system of claim 20, further comprising means for generating a signal to communicate the packetized data structure, the signal transmitted to at least one notification sink.

* * * * *